United States Patent
Baker et al.

(10) Patent No.: US 7,329,081 B2
(45) Date of Patent: Feb. 12, 2008

(54) APPARATUS FOR TRANSPORTING CONTAINERS

(75) Inventors: John Russell Baker, Onehunga (NZ); Alan Sydney Calvert, Waimauku (NZ); Sandra Louise Tulisi, Southport QLD (NZ)

(73) Assignee: Bakvertisi Limited, Auckland (NZ)

( * ) Notice: Subject to any disclaimer, the term of this patent is extended or adjusted under 35 U.S.C. 154(b) by 0 days.

(21) Appl. No.: 10/985,542

(22) Filed: Nov. 9, 2004

(65) Prior Publication Data

US 2005/0220600 A1    Oct. 6, 2005

Related U.S. Application Data

(63) Continuation of application No. PCT/NZ03/00090, filed on May 13, 2003.

(30) Foreign Application Priority Data

May 13, 2002   (NZ) ..................... 518940
Jun. 14, 2002   (NZ) ..................... 519607

(51) Int. Cl.
*B65G 1/04* (2006.01)
(52) U.S. Cl. ................. 414/626; 414/268; 414/277; 414/281
(58) Field of Classification Search ............. 414/268, 414/281, 626, 277, 284, 790.2
See application file for complete search history.

(56) References Cited

U.S. PATENT DOCUMENTS

| | | | |
|---|---|---|---|
| 2,765,928 A * | 10/1956 | Riemenschneider | 212/319 |
| 3,608,750 A * | 9/1971 | Young et al. | 414/277 |
| 3,964,619 A * | 6/1976 | Irmler | 414/281 |
| 3,973,683 A * | 8/1976 | Keller | 414/591 |
| 3,978,995 A * | 9/1976 | Zollinger et al. | 414/279 |
| 3,982,642 A * | 9/1976 | Muller | 414/268 |
| 4,005,786 A * | 2/1977 | Adelson et al. | 414/281 |
| 4,735,539 A * | 4/1988 | Hakkinen et al. | 414/281 |
| 4,838,749 A * | 6/1989 | Potocjnak | 414/277 |
| 5,328,316 A * | 7/1994 | Hoffmann | 414/280 |
| 5,379,229 A   | 1/1995 | Parsons et al. | |
| 5,558,483 A   | 9/1996 | Masuda | |
| 5,605,432 A * | 2/1997 | Fink et al. | 414/752.1 |
| 5,630,692 A * | 5/1997 | Hanaya | 414/277 |
| 5,688,096 A * | 11/1997 | Gagnon et al. | 414/152 |

(Continued)

FOREIGN PATENT DOCUMENTS

EP    0 767 113    4/1997

(Continued)

*Primary Examiner*—James Keenan
(74) *Attorney, Agent, or Firm*—Merchant & Gould P.C.

(57) ABSTRACT

An automated apparatus suitable for transporting containers arranged in a row of stacks or partial stacks includes an overhead gantry system. The overhead gantry system has a moveable support for supporting at least one stack or partial stack of containers and moving them along the row. The gantry system also has an engagement device such as arms which are moveable transverse to the row independently of the support between a first position in which the engagement device can engage with a required container in the row, and a second position in which the engagement device and antcontainers engaged therewith are above the support to allow the containers to be placed either on the support or on another partial stack supported by the support. The support can travel along the row when the engagement device is in the second position.

15 Claims, 19 Drawing Sheets

U.S. PATENT DOCUMENTS

| | | | |
|---|---|---|---|
| 5,816,774 A * | 10/1998 | Stolzer et al. | 414/792.8 |
| 6,000,904 A * | 12/1999 | Schlusselbauer | 414/792.9 |
| 6,061,607 A | 5/2000 | Bradley et al. | |
| 6,315,513 B1 * | 11/2001 | Harukawa et al. | 414/286 |
| 6,321,138 B1 | 11/2001 | Livesay et al. | |
| 6,602,037 B2 * | 8/2003 | Winkler | 414/273 |
| 6,692,210 B1 * | 2/2004 | Ettelbruck | 414/222.01 |
| 6,923,612 B2 * | 8/2005 | Hansl | 414/277 |
| 2004/0165974 A1 * | 8/2004 | Gironi et al. | 414/281 |

FOREIGN PATENT DOCUMENTS

| | | |
|---|---|---|
| EP | 1 122 194 | 8/2001 |
| WO | 02/059021 | 8/2002 |

* cited by examiner

A

B

APPARATUS FOR TRANSPORTING CONTAINERS

This application is a Continuation of International Application No. PCT/NZ03/00090 filed May 13, 2003, which application(s) are incorporated herein by reference.

TECHNICAL FIELD

This invention relates to automated apparatus for moving containers and methods of container handling and in particular but not exclusively to a warehousing system.

BACKGROUND

Automated systems for moving containers within a warehouse represent an opportunity to provide advantages in container handling, including providing increased speed of movement, more accurate tracking of product and reduced cost, particularly for medium to large sized warehouses. The automated system may be in the form of one or more conveyors and/or a robot movable over a working area.

The amount of useful work that a robot system performs is dependent on the speed of travel of the robot and the distance that the robot has to travel between each pick-up and drop-off of containers. If a distance greater than the minimum required distance is travelled by a robot, there is a corresponding reduction in the throughput capacity of the warehouse.

A robot system is described in the specification published as European Patent Publication EP0767113. The system includes a robot that travels over a horizontal pick face formed by a number of stacks of containers. The robot has a vertically movable gripping device that is lowered over a stack until a required number of containers are enclosed within an enclosed loading space. The gripping device then grips the containers, raises them above the pick face and transports them to a required location, where they are lowered onto the ground or onto a partial stack of containers. The amount of travelling that the robot has to do is dependent on the spacing of the pick-up and drop-off points and the vertical distance that the robot has to travel to pick-up and drop off stacks. The vertical movement required to enclose the gripped containers can materially increase the time needed to pick-up and drop off stacks. The robot requires a large amount of space above the stacks, at least one stack high in order to be able to move over the stacks. This can be disadvantageous in some implementations where vertical space is limited. Raising a heavy gripper and heavy contained load into the space above the stored stacks and moving them quickly through this space requires a substantial robot together with substantial supporting structure. Such a robot and support structure is expensive to manufacture, install and commission.

Other automated picking systems include what is known as an Automated Storage and Retrieval System (ASRS). An example ASRS is described in the specification of U.S. Pat. No. 5,379,229. An ASRS uses racks to store containers, and is thus not suitable for use with individual stacks of containers placed one on top of each other on a store surface. Thus, an ASRS may be unsuitable for low volume retrieval of containers.

It is thus an object of the present invention to provide apparatus for moving containers within a warehouse that overcome or alleviate problems in such at present.

Another or alternative object of one embodiment of the present invention is to provide apparatus for moving containers that is viable for low volume container picking or to provide apparatus for moving containers within a warehouse that has less vertical space available.

Another or alternative object of one embodiment of the present invention is to provide apparatus for moving containers that is of less cost, shorter installation period and/or requiring less substantial supporting structure than existing apparatus at present.

Another or alternative object of the present invention is to at least provide the public with a useful alternative Further objects of the present invention may become apparent from the following description.

SUMMARY OF THE INVENTION

According to a first aspect of the present invention, there is provided automated apparatus suitable for transporting containers arranged in one or more rows of stacks or partial stacks, the apparatus including movable engagement means for engaging with one or more containers in a row, wherein the apparatus is operable to move the engagement means transverse to at least a first row between a first position where the engagement means can engage with any required container in the first row from beside a stack or partial stack and a second position in which the engagement means, any containers engaged with the engagement means and any containers located thereon are beside said first row, move the engagement means along the first row when the engagement means is located in the second position and move containers engaged with the engagement means vertically, thereby allowing a container or partial stack engaged with the engagement means to be placed as required either on another partial stack or on a support for supporting stacks or partial stacks.

Preferably, the second position may be defined as any area between the first row and a second row extending substantially parallel to the first row in which the engagement means can travel along the first and second rows and wherein the apparatus may be operable to move the engagement means transverse to the second row, between a third position where the engagement means can engage with any required container in the second row from beside a stack or partial stack and the second position.

Preferably, the apparatus may be operable to move containers engaged with the engagement means vertically by moving the engagement means vertically.

Preferably, the apparatus may include a platform for supporting at least one stack or partial stack and movable with the engagement means along said row or rows, wherein the engagement means may in use place one or more stacks or partial stacks onto the platform when it is in the second position.

Preferably, the engagement means may depend from a trolley supported by a carriage and wherein the carriage is movable along said row or rows and the trolley is movable transverse to said row or rows.

Preferably, the apparatus may include a guide that in use aligns a first partial stack located beneath the engagement means with a second partial stack engaged with the engagement means so as to allow the engagement to release the second partial stack onto the first partial stack.

Preferably, the apparatus may be suitable for transporting containers arranged on a floor in one or more rows of spaced apart stacks or partial stacks, wherein the engagement means includes at least one arm that is located in the space between stacks or partial stacks in the row or rows when the engagement means is in the first position.

Preferably, the engagement means may include at least two arms spaced apart by either one or two columns in a row.

Preferably, the may be suitable for transporting containers arranged on a floor in at least two adjacent rows of spaced apart stacks or partial stacks, wherein the at least one arm is dimensioned to be able to engage with containers across two or more rows.

Preferably, the engagement means may span two or more stacks along a row and be engageable with at least one container in each of said two stacks.

Preferably, the engagement means may be moved along and transverse to the row or rows by an overhead gantry system.

Preferably, the apparatus may further include a conveyor extending along said row or rows, wherein the engagement means is operable to retrieve and place stacks or partial stacks from or onto said conveyor respectively.

Preferably, the apparatus may include conveying means to convey containers to the gripping means and receive containers from the gripping means and convey containers away from the gripping means, the conveying means extending into a gap along the length of said second row.

According to a second aspect of the present invention, there is provided a container store including space to hold one or more rows of stacks of containers and apparatus as described in the preceding paragraphs, adjacent to said one or more rows, and wherein the container store includes in the line of at least one of said one or more rows of stacks a plurality of shelves for holding partial stacks, wherein the shelves are located, shaped and dimensioned so that the engagement means of said apparatus can engage with containers held on the shelves.

Preferably, each shelf may hold only a single container.

Preferably, the container store may further include one or more tails areas in which mixed containers of product are made by picking product from containers and placing picked product into a required container, wherein said apparatus is operable to retrieve mixed containers of product from the one or more tails areas and supply containers said one or more tails areas.

According to a third aspect of the present invention, there is provided a method for storing and transporting containers, the method including arranging containers in one or more rows of stacks or partial stacks, engaging with one or more containers in at least one stack or partial stack in at least one row by moving a movable engagement means from beside the row into to a position where the engagement means can engage with said one or more containers from their side, moving the engagement means, any containers engaged with the engagement means and any containers located thereon into a position, beside said at least one row and then moving the engagement means along said at least one row and moving the containers vertically and transverse the row as necessary to place containers engaged with the engagement means in a required location.

Preferably, the method may include arranging containers in at least two rows of stacks or partial stacks so as to define an aisle there between, moving the engagement means as required to engage with containers in one or said at least two rows and then moving the engagement means, any containers engaged with the engagement means and any containers located thereon into the aisle prior to moving the engagement means along said at least two rows.

Preferably, the method may include providing a platform for supporting at least one stack or partial stack and moving the platform with the engagement means along said row or rows, and using the engagement means to retrieve stacks or partial stacks and place them onto the platform or onto another partial stack already on the platform.

Preferably, the method may include moving the engagement means using an overhead gantry system.

Preferably, the method may include providing a conveyor to transport containers to and away from the engagement means and using the engagement means to replenish the row or rows by retrieving containers from the conveying means and placing containers into a row and using the engagement means to retrieve containers from the row or rows and place them onto said conveyor to fulfil an order.

According to a fourth aspect of the present invention, there is provided a method of container storage and retrieval including storing containers in one or more rows of stacks of containers and using the method described in the preceding paragraphs, wherein the method further includes storing in the line of at least one of said one or more rows of stacks a plurality of shelves for holding partial stacks of like product, wherein the shelves are located, shaped and dimensioned so that the engagement means used in said method can engage with containers held on the shelves.

Preferably, each shelf of said plurality of shelves holds only a single container.

Preferably, the method may include providing a tails station and moving the engagement means so as to supply the tails station with containers from said shelves.

According to a fifth aspect of the present invention, there is provided a method of container handling for a controlled area including conveying means for transporting groups of containers from a supply of containers to an output, a container store and an automated apparatus operable to transport containers between the conveying means and the container store, the method including providing a required number of containers at the output by:

a) placing full groups of containers onto the conveying means at the supply of containers and conveying the full groups to the output;

b) identifying a partial group of containers required to complete the order and supplying the identified partial group by:

i) if there are sufficient containers in the store to make up the partial group, using the automated apparatus to retrieve containers from the container store and place the retrieved containers on the conveying means, and then conveying the partial group to the output; or ii) if there are insufficient containers in the store or if it is required to store more containers in the store, placing a full group of containers onto the conveying means at the supply of containers, using the automated apparatus to remove excess containers from the full group and place the removed excess containers in the container store and conveying the resulting partial group to the output.

Preferably, containers are placed into the store only when there are insufficient containers in the store to form a required partial group of containers.

Preferably, the groups of containers are in the form of stacks.

Preferably, the method may include placing containers that occur in orders with higher frequency into the container store closer to the conveying means than containers that occur in orders with less frequency.

Further aspects of the present invention, which should be considered in all its novel aspects, may become apparent from the following description, given by way of example only and with reference to the accompanying drawings.

DEFINITIONS

"Manager computer"—refers to a control system to control the operation of apparatus for transporting containers. By way of illustrative example and without limitation, a manager computer may include a warehouse management system, which maintains an inventory of containers and/or products coming into and being removed from a controlled area, and the locations of product within the controlled area.

"Controlled area"—refers to an area of a warehouse or other storage and product management area under the control of the manager computer.

"Container"—refers to any unit for holding a product and includes, without limitation, crates, boxes, tins, cartons, cases, totes or a plurality of grouped containers, such as a pallet of containers or a group of bound containers.

"Stack"—refers to a set number of containers, one on top of the other.

"Partial stack"—refers to fewer than the set number of containers that form a complete stack.

"Row"—refers to a plurality of stacks or partial stacks located side by side, optionally with spaces between each stack.

"Warehousing system"—refers to a system for the controlled storage and retrieval of product held in containers and includes both systems located in open-air and systems enclosed within a building.

MODES FOR CARRYING OUT THE INVENTION

The present invention relates to warehousing systems and more particularly to automated apparatus for moving containers within a warehousing system. The invention also relates to a method of container management and a control system for the handling of containers. The invention may have particular application to the handling of low volume product.

Figure 1:
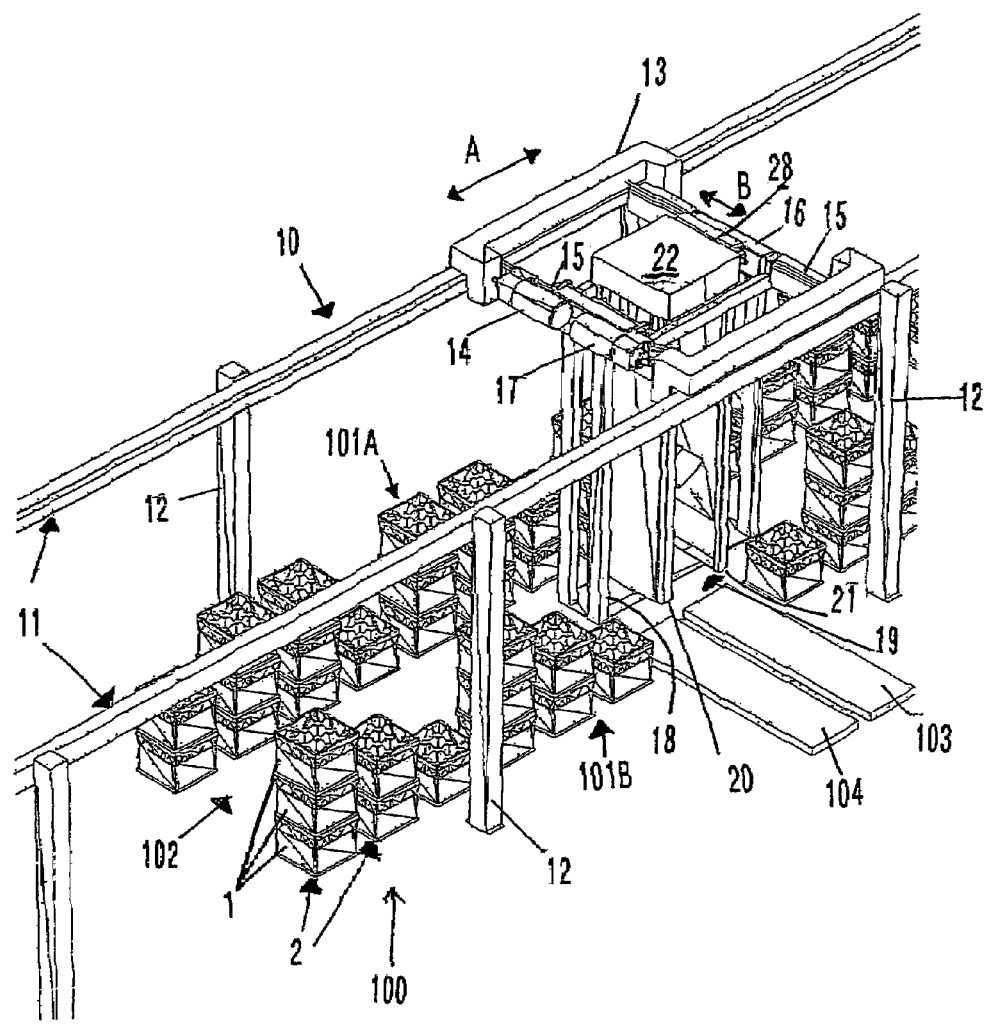
FIG. 1: Shows part of a controlled area including apparatus for transporting containers according to a first embodiment of the present invention.

Referring to FIG. 1 of the accompanying drawings, a perspective view of a portion of a controlled area 100 in a warehousing system in accordance with the present invention is shown. The controlled area 100 includes a container store 101A, 101B arranged in two rows separated by an aisle 102. The container store 101A, 101B is located on a floor that may for example be a concrete foundation, supporting rails for the rows or other suitable support for the container store 101A, 101B. In the example shown, the container store 101A, 101B is storing crates of milk, although any containers may be used where the containers are storable in stacks.

An in-feed conveyor 103 supplies containers to the controlled area 100 and an out-feed conveyor 104 takes containers away from the controlled area 100, typically to another controlled area. Within the container store 101A, 101B is located a number of containers 1 arranged in stacks 2. For reasons of clarity of illustration, only two stacks are indicated by reference number 2 in FIG. 1, one of which is a partial stack of three containers and the other is a partial stack of two containers. A full stack in this embodiment is four containers high. A full stack may be made up of two, three or more than four containers by appropriate scaling in other embodiments of the present invention.

The controlled area 100 includes an overhead gantry system 10. The overhead gantry system 10 includes a pair of rails 11 held over the container store 101A, 101B by supports 12. On rails 11 is located a carriage 13 movable along the rails as indicated by arrow A. Movement of the carriage 13 may be achieved by an electric motor 14 under control of a manager computer. Extending down from the carriage 13 is a platform 18, on which stacks or partial stacks may be placed. The platform 18 remains in the aisle 102 as the carriage 13 moves along the aisle. The carriage 13 includes rails 15 on which is supported a trolley 16 movable transverse to the rows defined by the container store 101A, 101B along the rails 15 as indicated by arrow B. Movement of the trolley 16 may be achieved by an electric motor 17 under the control of a manager computer.

Extending down from the trolley 16 is a gripping mechanism 19 for gripping one or more containers 1 in a stack 2. The gripping mechanism 19 in this embodiment includes two arms 20 and 21 extending downwards so as to form an inverted "U" with an upper surface 22 of the gripping mechanism 19. The arms 20 and 21 fit in spaces provided between each stack 2 to enable engagement with one or more containers 1 in a stack from the sides of the containers 1 that face along the container store 101A, 101B.

In other embodiments, the gripping mechanism may include more than two arms, which may in some circumstances increase the throughput capacity of the controlled area 100, particularly if a buffer area is provided, for example using a system of conveyors in communication with the out-feed conveyor 104, to allow the manager computer to control the gripping mechanism to retrieve multiple orders at the same time and/or if typical orders require more than a full stack of containers and the container store 101A, 101B is arranged so that like products are stored in adjacent stacks.

Further, in other embodiments, the platform 18 may be sufficiently wide to allow two or more stacks or partial stacks to be placed on its surface. If more flexibility is required, then the platform 18 may be movable relative to the arms 20, 21 in order to allow multiple stacks or partial stacks to be placed on the platform 18 along its length. The gripping mechanism 19 may travel about any stacks or partial stacks on the platform 18, or may be controlled to pick containers in a certain order to avoid this requirement, which may be preferable if there is a chance that the stacks or partial stacks may move about on the platform 18, resulting in a collision with the arms 20, 21.

Figure 2:
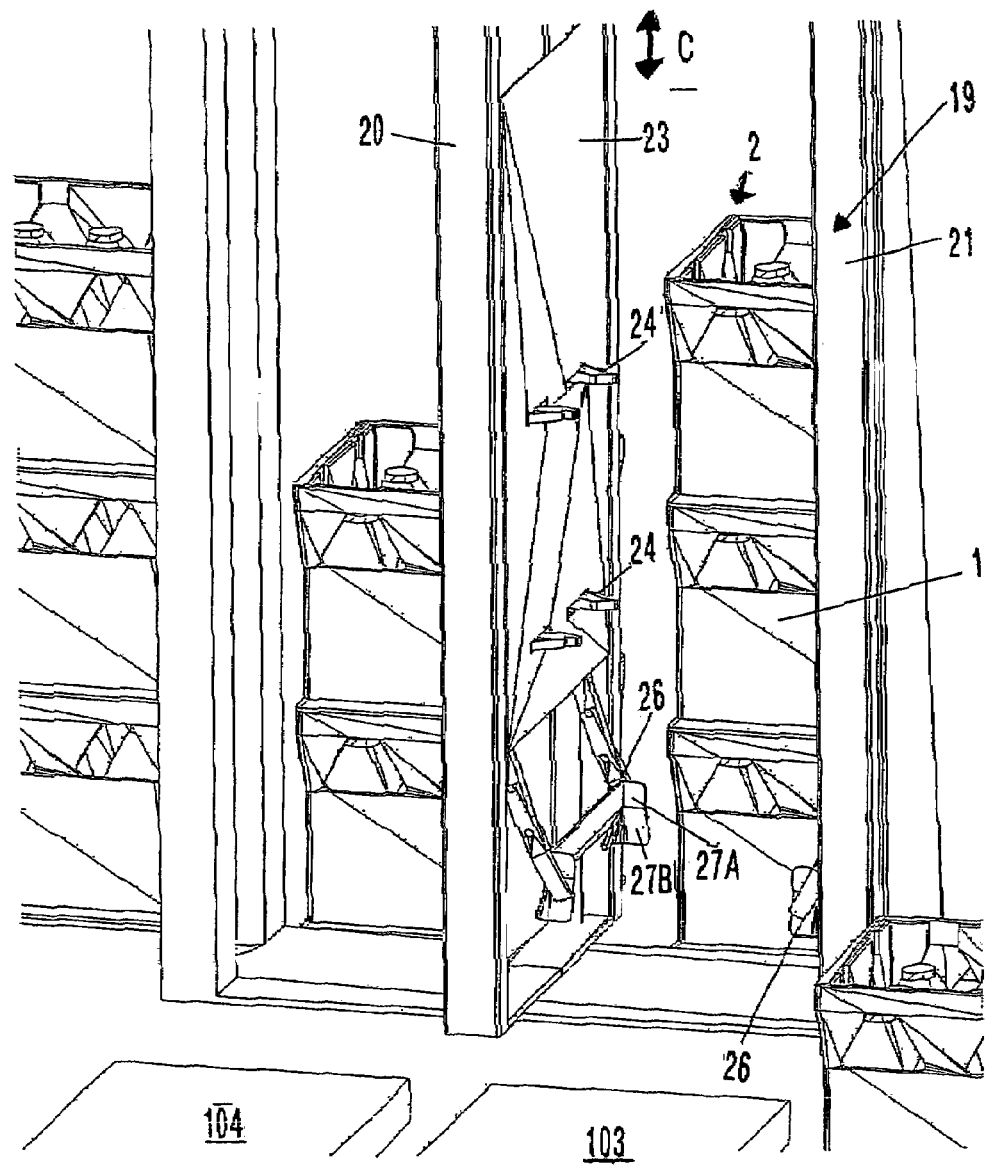
FIG. 2: Shows an enlarged view of the apparatus for transporting containers shown in FIG. 1 when the container engagement means is in an extended position.
Figure 3:
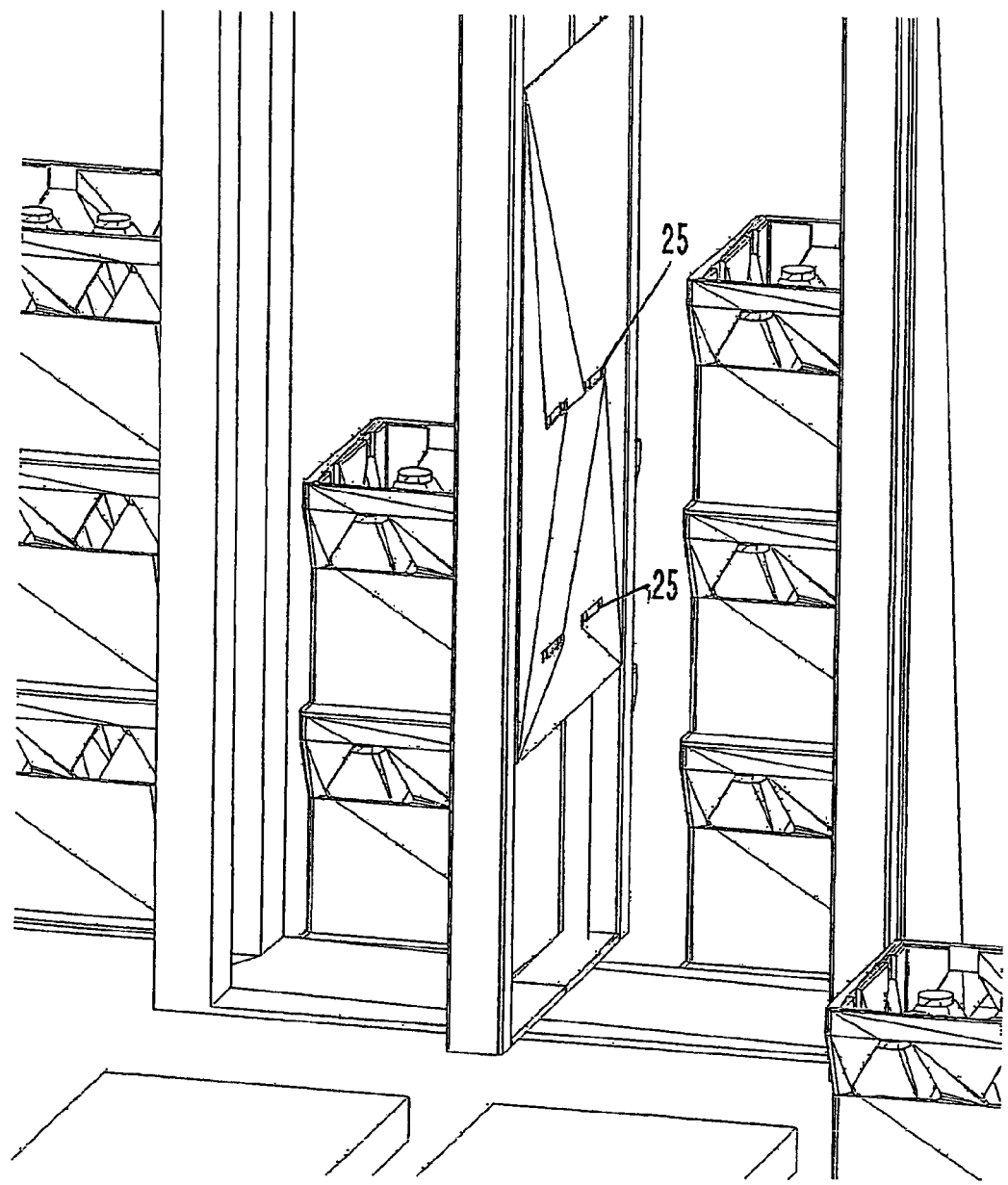
FIG. 3: Shows an enlarged view of the apparatus for transporting containers shown in FIG. 1 when the container engagement means is in a retracted position.
Figure 4:
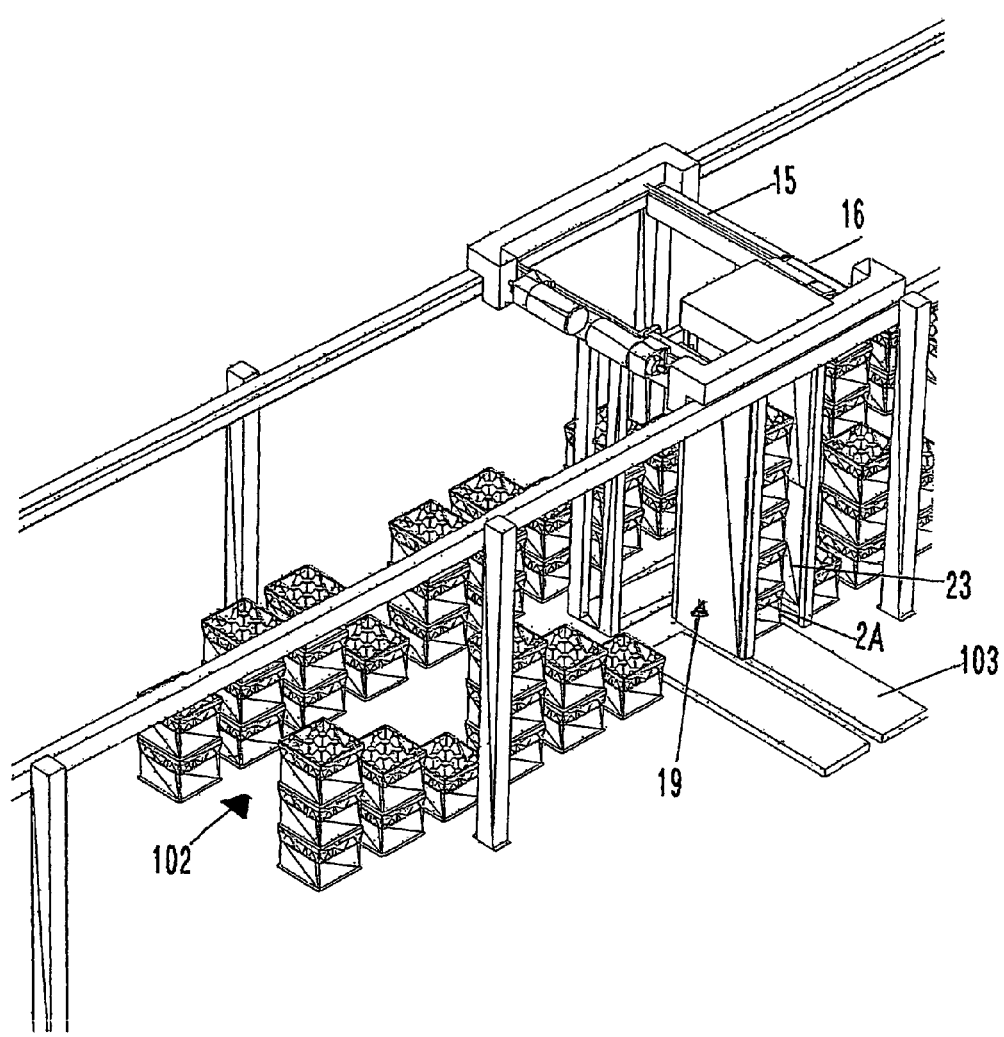
FIGS. 4-14: Show an example of the operation of the apparatus of FIG. 1 within the controlled area.
Figure 5:
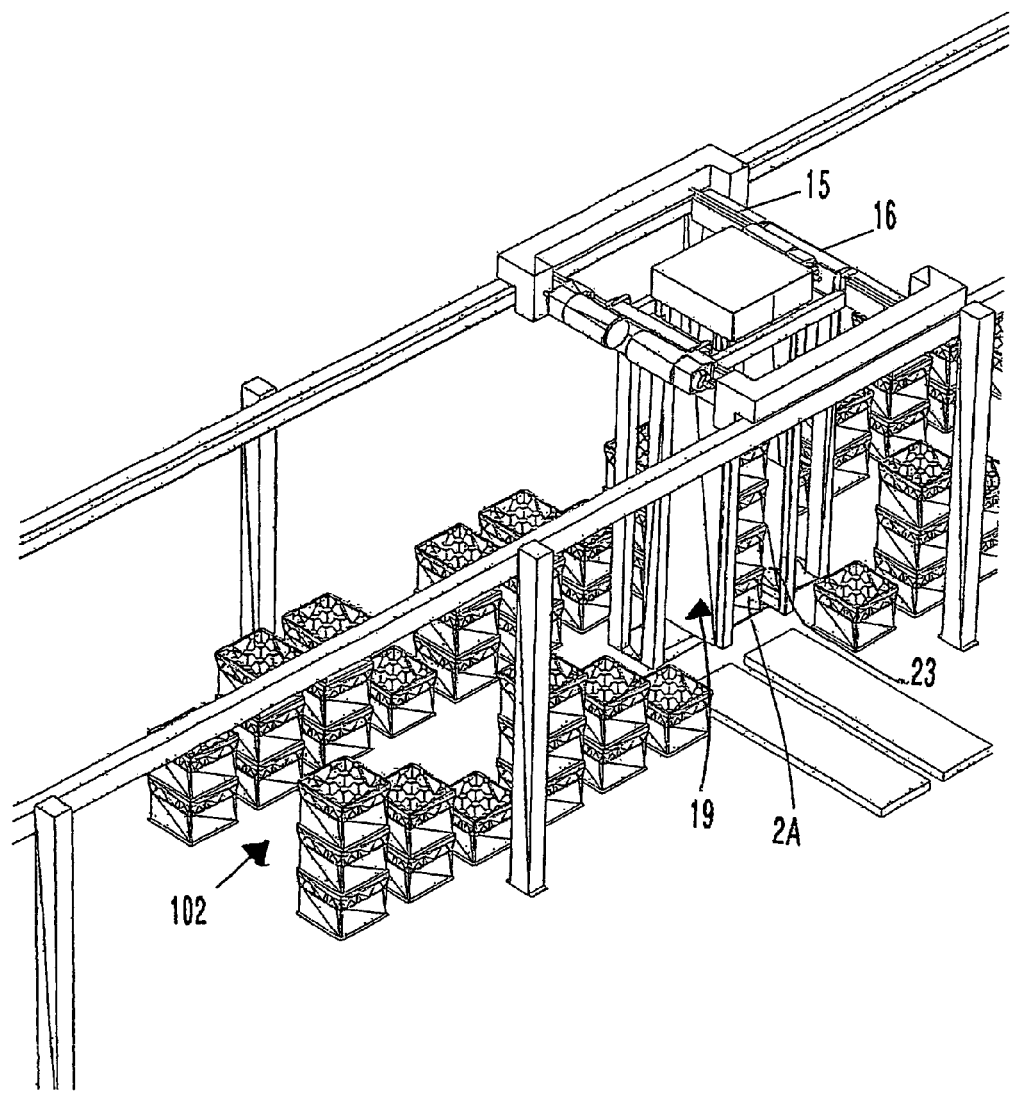

Referring particularly to FIGS. 2 and 3, an enlarged view of the gripping mechanism 19 is shown. Each of the arms 20, 21 include a side plate 23 to support containers 1 engaged with the gripping mechanism 19. Retractable tangs 24 are extendible through apertures 25 in the side plates 23, the tangs 24 shown in their extended position in FIG. 2 and in their retracted position in FIG. 3. The tangs 24 extend into recesses or apertures in the side walls of the containers 1 to securely engage with the containers 1. How the tangs 24 or similar mechanism engage with the containers will depend on the shape of the containers. For example, the tangs 24 may engage with a handle of the container, or slide in beneath the container from the side if the base of the container includes a channel or groove into which the tangs 24 can be inserted. The tangs 24 would be replaced by an alternative mechanism if required for handling of a particular type of container.

The side plates 23 are moveable vertically as indicated by arrow C to allow containers 1 to be lifted from a stack or the floor and replaced on a stack or on the floor. Also, lifting would typically be required before the containers are moved in direction B (see FIG. 1). This lifting movement is required if the containers 1 in a stack 2 are meshed and even if the containers 1 are not meshed may be required to ensure that lower containers are not moved out of position when upper containers are removed from a stack 2.

In an alternative embodiment, tangs 24 or other mechanism provided to engage with containers may be provided at each location in a stack and fixed in position. Only the tangs 24 located at the lowest position of a stack or partial stack may be used to engage a stack or partial stack or all tangs corresponding to the positions of the containers to be engaged may be used. A ram or other means to move containers vertically may be provided to shift containers upwards to an adjacent set of tangs 24 should a container or partial stack need to be located on top of a partial stack that has its highest container at a level equal to or higher than the lowest container held by the tangs 24. The ram may move out from within the confines of one of the arms 20, 21 when required to move containers. If the containers need to be shifted downwards, the tangs 24 could be released, allowing the containers to move downwards either under their own weight, or under the control of the ram or similar.

Occasionally, a stack 2 of containers 1 may move slightly out of position. In order to avoid the requirement for a sensing and feedback system, a guide 26 may be provided on each arm 20, 21. The guides 26 also have an extended and retracted position. When the gripping mechanism 19 is placing containers onto an existing partial stack, the guides 26 are extended before the base of the lowest container held by the tangs 24 nears the upper edge of the uppermost container of the partial stack that it is to be meshed with. The guides 26 include a flange 27A that engages with the bottom edge of the lowest container held by the tangs 24. The guides 26 also include a flange 27B to receive the top edge of the uppermost container of the receiving partial stack and push that container towards the centre of the guide 26 and hence into alignment with the bottom edge of the lowest container engaged with the tangs 24. When a container on the floor of the store 101A, 101B is to be engaged with tangs 24 the guides 26 do not extend to prevent contact with the floor. Alternatively, the store floor may be raised to allow room for the guides 26 below the lowest container. Alternative means for positioning a stack or adjusting for movement of stacks by corresponding movement of the gripping mechanism may be used if required. However, the use of guides 26 or similar may be preferred due to representing a cost effective means to align stacks. An alternative to guides 26 may be guides in the form of elongate guide members (not shown) extending vertically, the members locatable to abut the corners of containers in a stack to act to align containers in the stack. The elongate members may have a length approximately equal to the height of a full stack of containers, avoiding the requirement for vertical movement of the elongate guide members.

In the embodiment shown FIGS. 2 and 3, two sets of tangs 24 are provided to allow engagement with two vertically adjacent containers 1. The guide 26 abuts the edge of lowest container that is being engaged by tangs 24, below the tangs 24. One set of tangs or more than two sets of tangs may alternatively be used. When two or more sets of tangs are provided, the arms 20, 21 extend above the height of the stacks 2 by at least one container to allow a single container to be removed from the top of a stack if required. A motor 28 (see FIG. 1) may cause the extension and retraction of tangs 24 and guides 26, the motor 28 controlled by a manager computer.

Those skilled in the relevant arts will appreciate that there are a number of alternative ways in which to engage with containers in a stack other than protruding tangs into a recess or aperture, which may be used with the present invention. For example, a clamp may clamp about the sides of a container or suction cups may be provided. Also, there are a number of alternative ways to move the gripping mechanism or other engagement means, including a floor rail system or a wheeled cart.

FIGS. 4 to 14 show an example of the operation of the warehouse control system to move a stack into a store and retrieve containers from the store. For clarity, only the reference numerals referred to herein below are reproduced in FIGS. 4 to 14. A new stack 2A is transported into the controlled area 100 by conveyor 103. If it was not already there, the gripping mechanism 19 moves into position around the stack 2A (FIG. 4), the side plates 23 move to a low position to enable tangs 24 to engage with the lowest and second lowest containers in stack 2A. The entire stack may then be lifted off the conveyor by moving the side plates 23 (and hence the tangs 24) upwards and then moved into the aisle 102 to the position shown in FIG. 5 by movement of the trolley 16 along rails 15.

Figure 6:
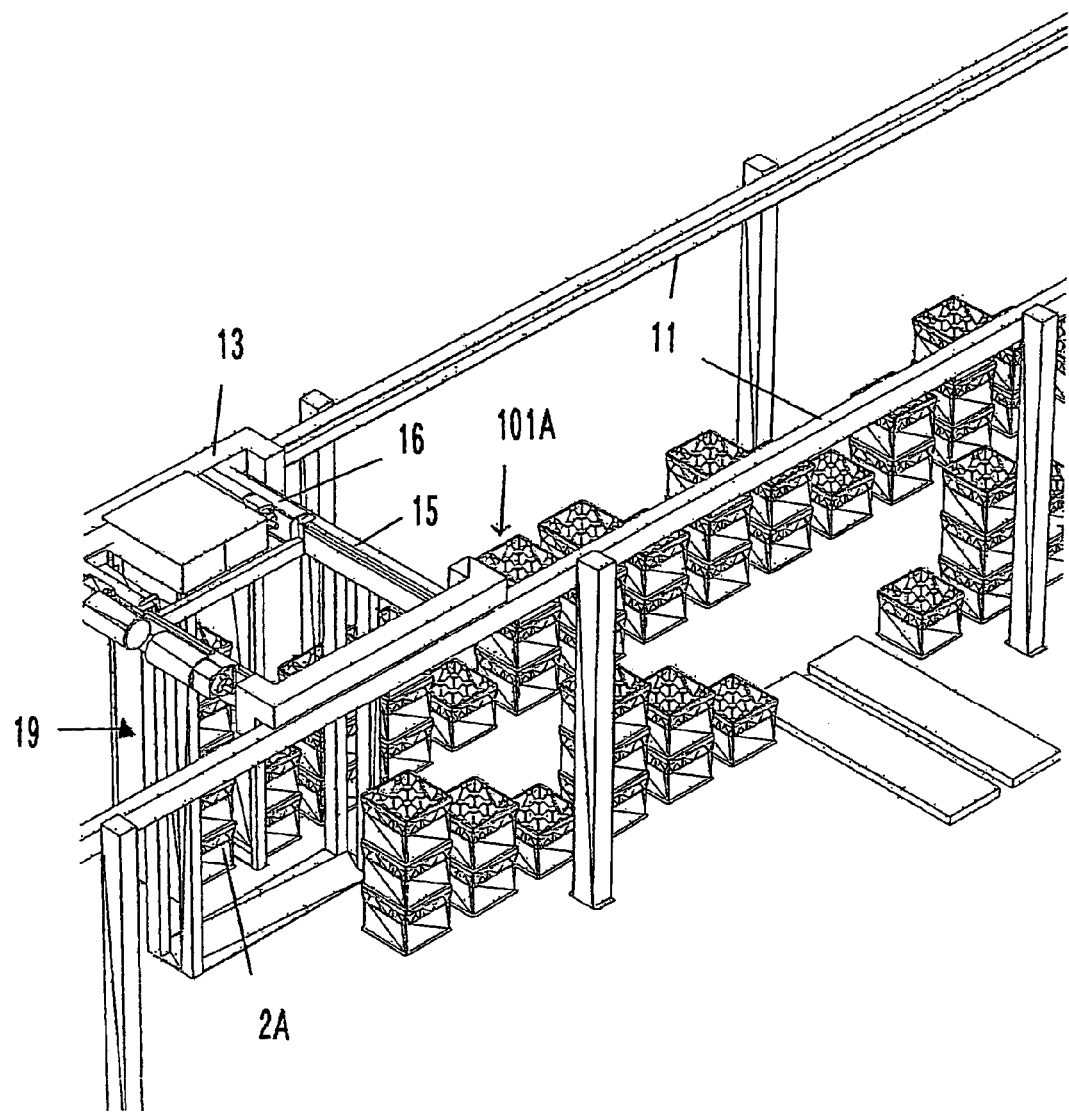
Figure 7:
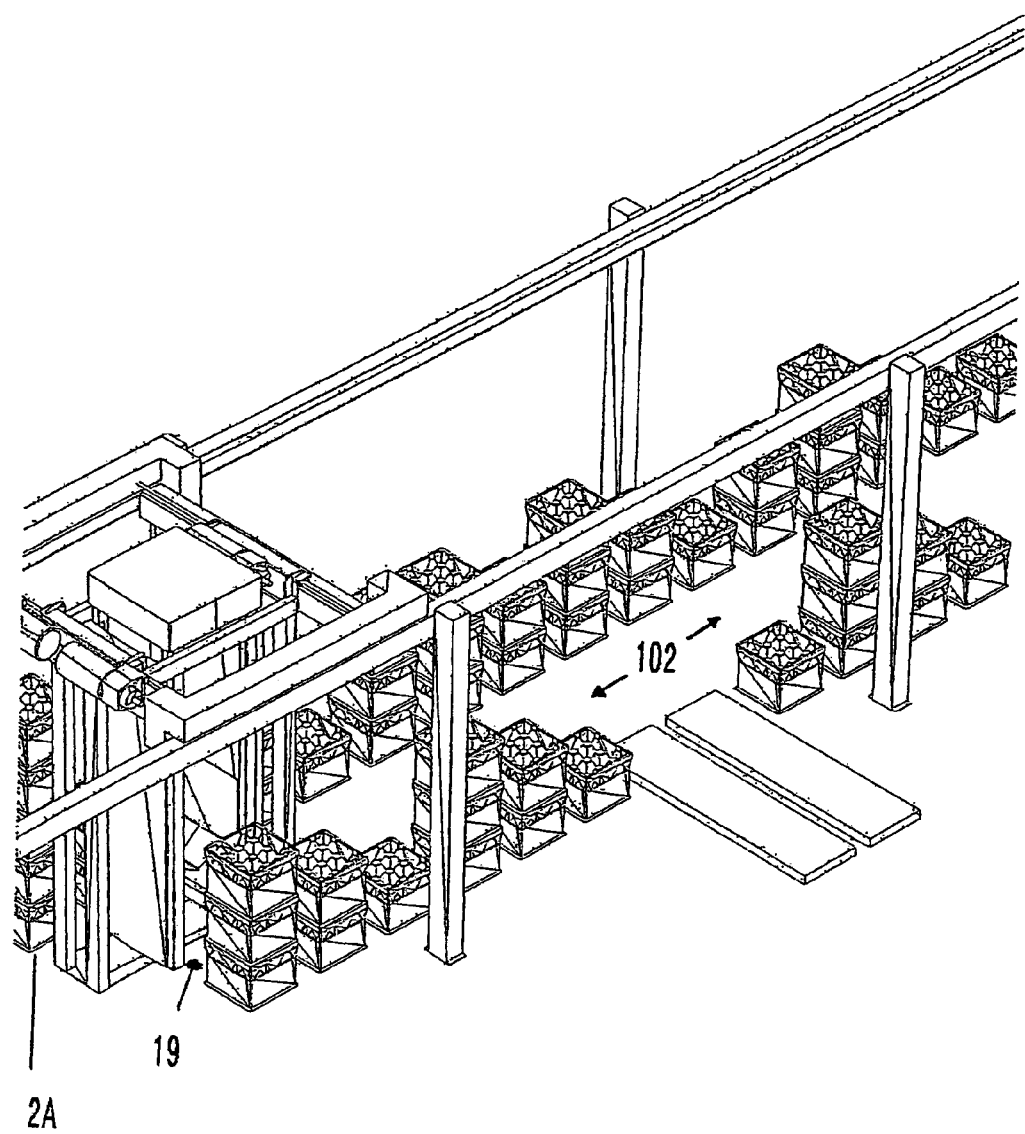

The stack 2A is moved adjacent to a required space in the store 101A by movement of the carriage 13 along rails 11 and moved into the store 101A by movement of the trolley 16 along rails 15 (FIG. 6). The side plates 23 are lowered so that the stack 2A rests on the surface of the store 101A and the tangs 24 are retracted. The gripping mechanism 19 then moves back into the aisle 102, leaving the stack 2A in the store 101A (FIG. 7). This completes the storage operation.

Figure 8:
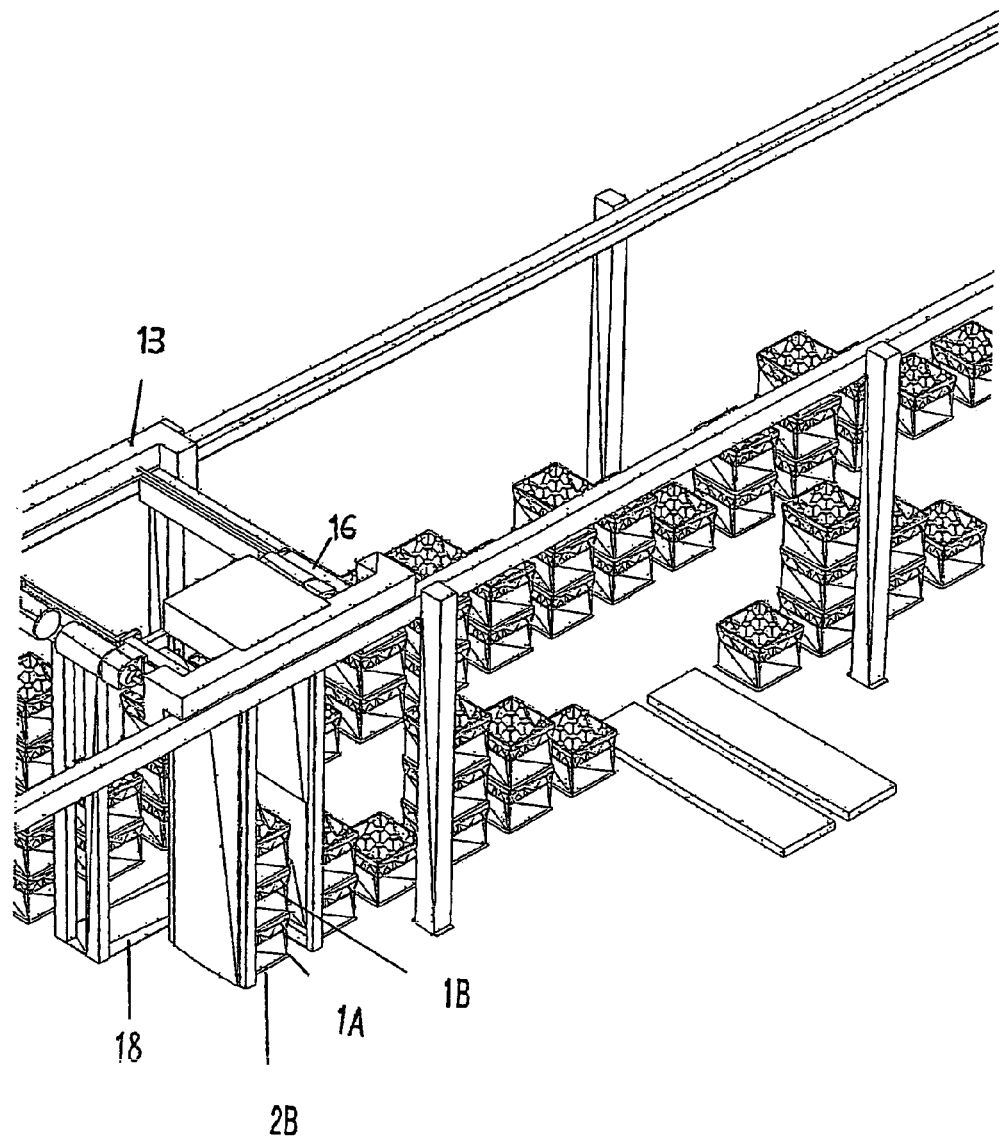
Figure 9:
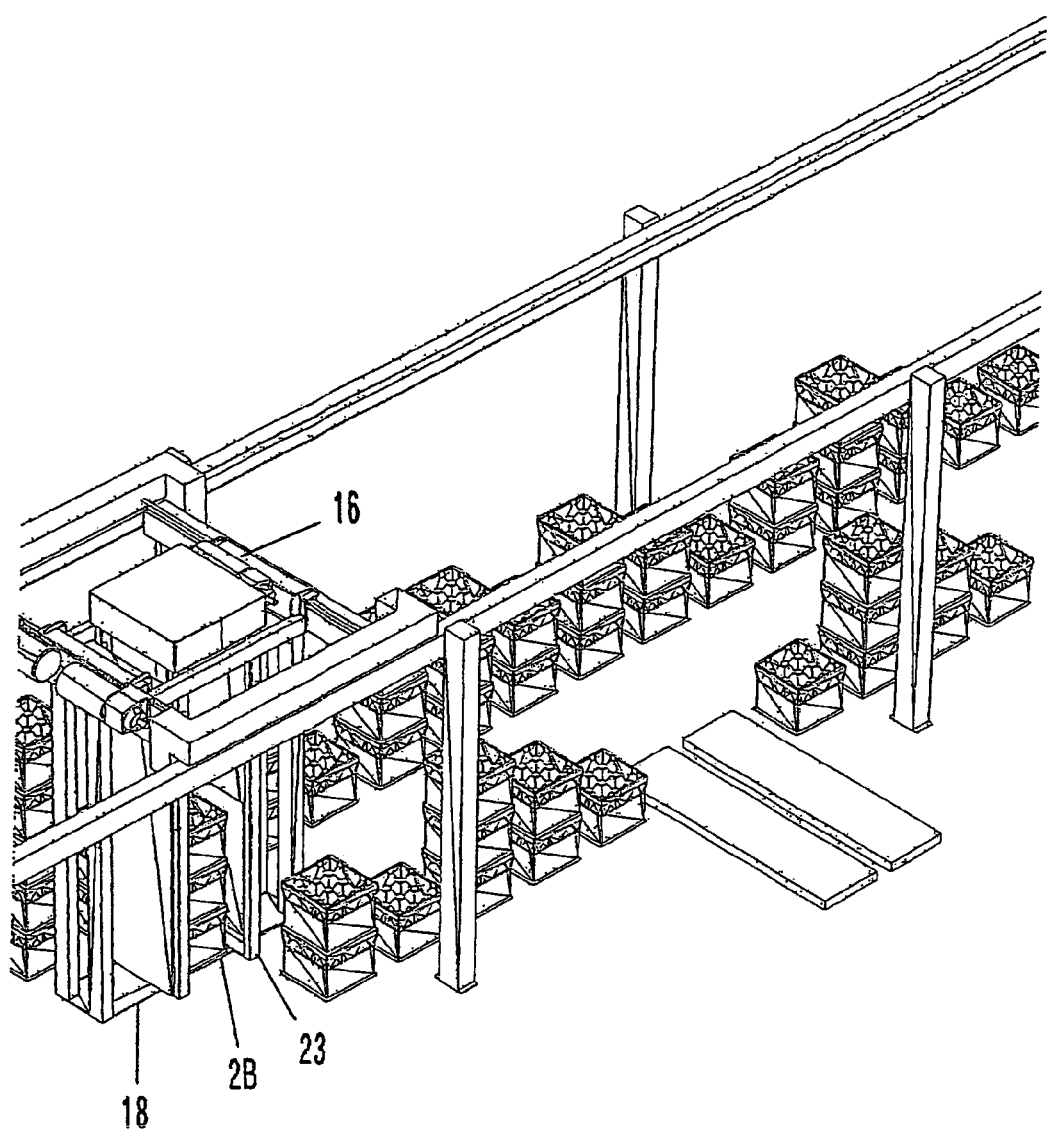
Figure 10:
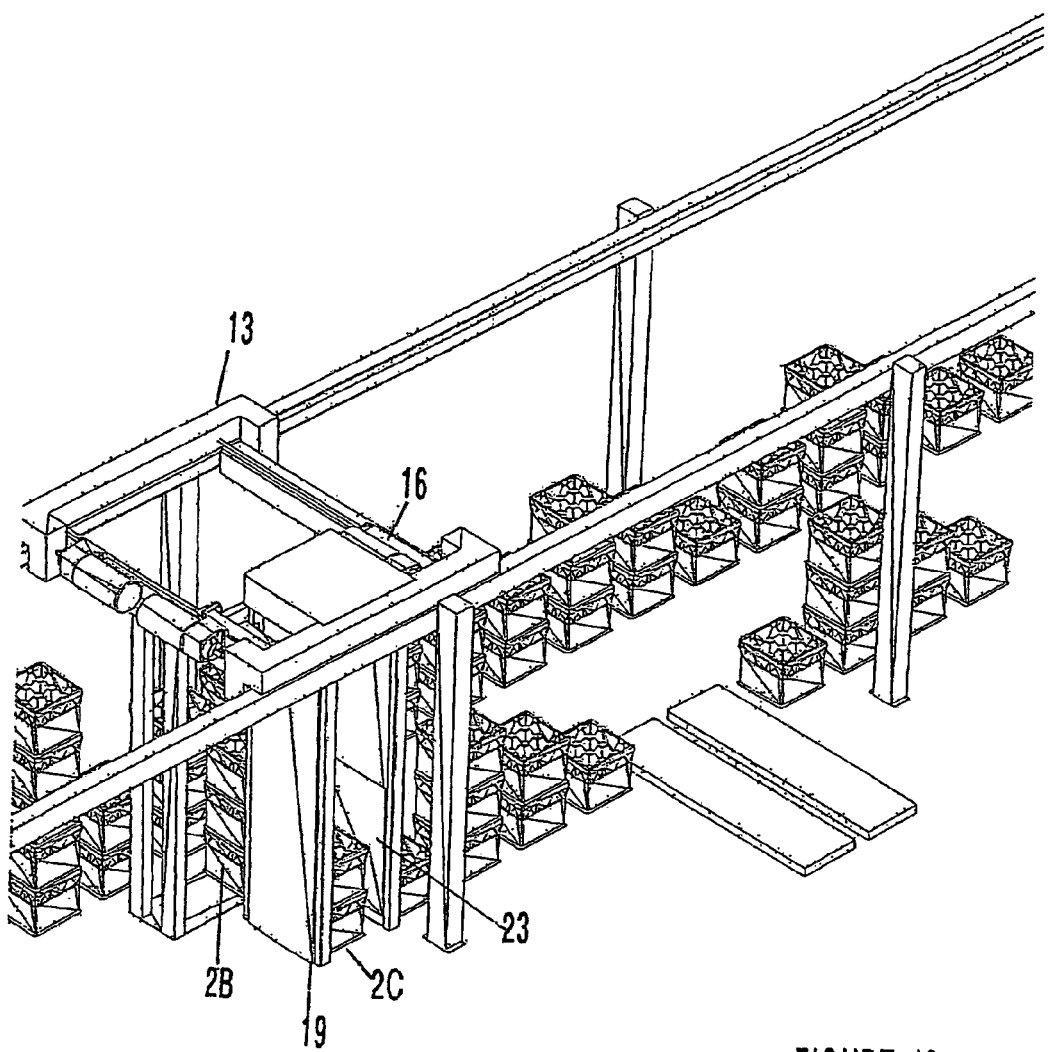
Figure 11:
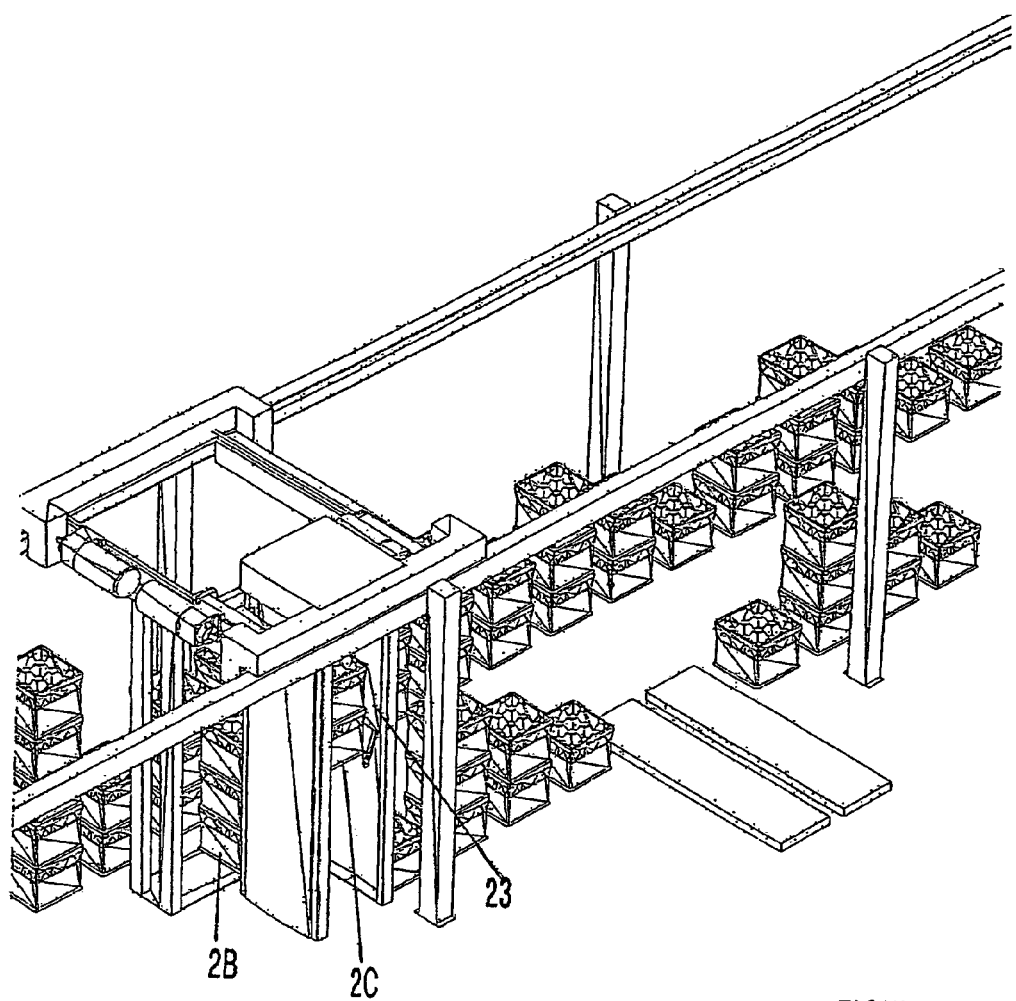
Figure 12:
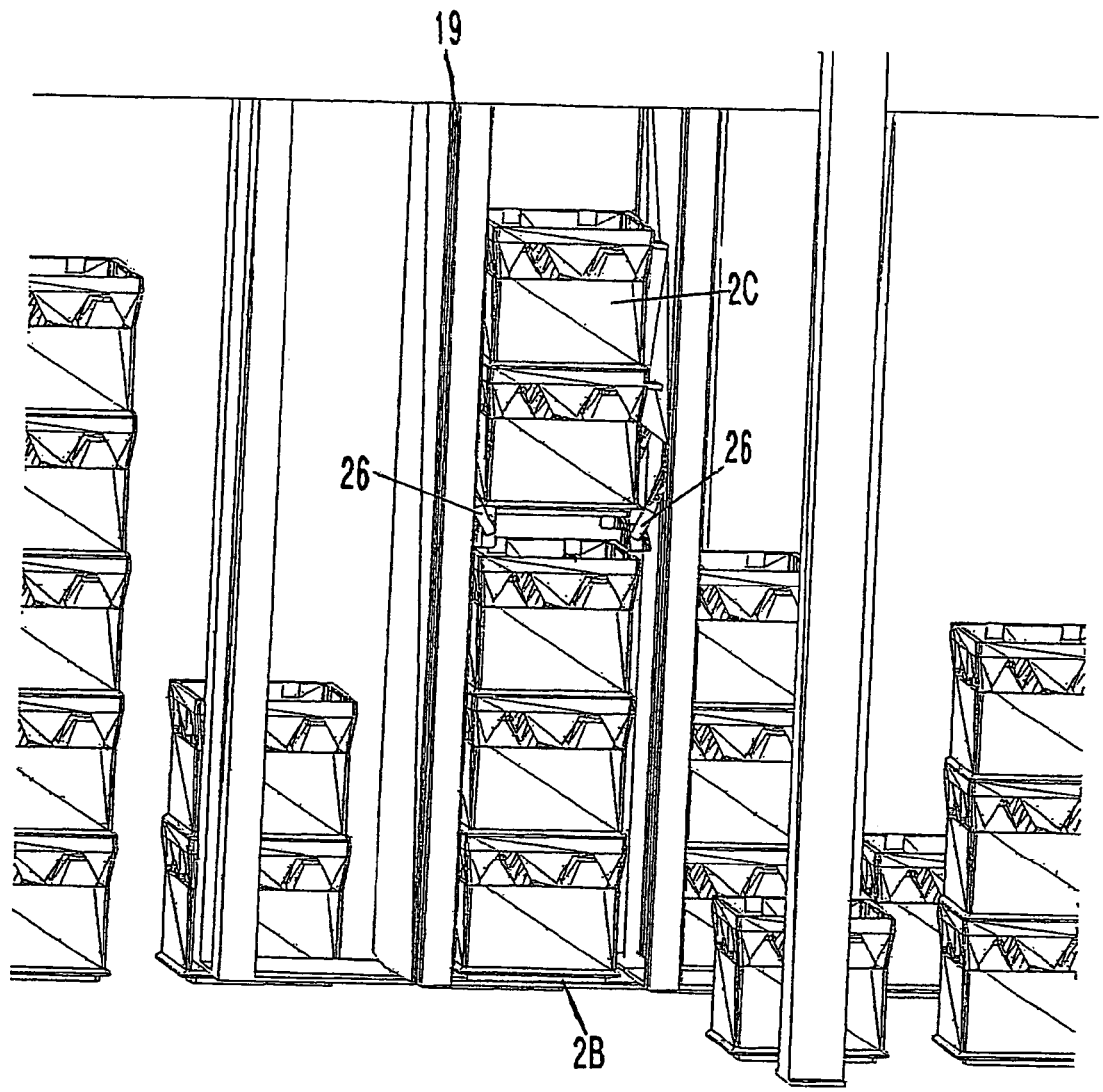
Figure 13:
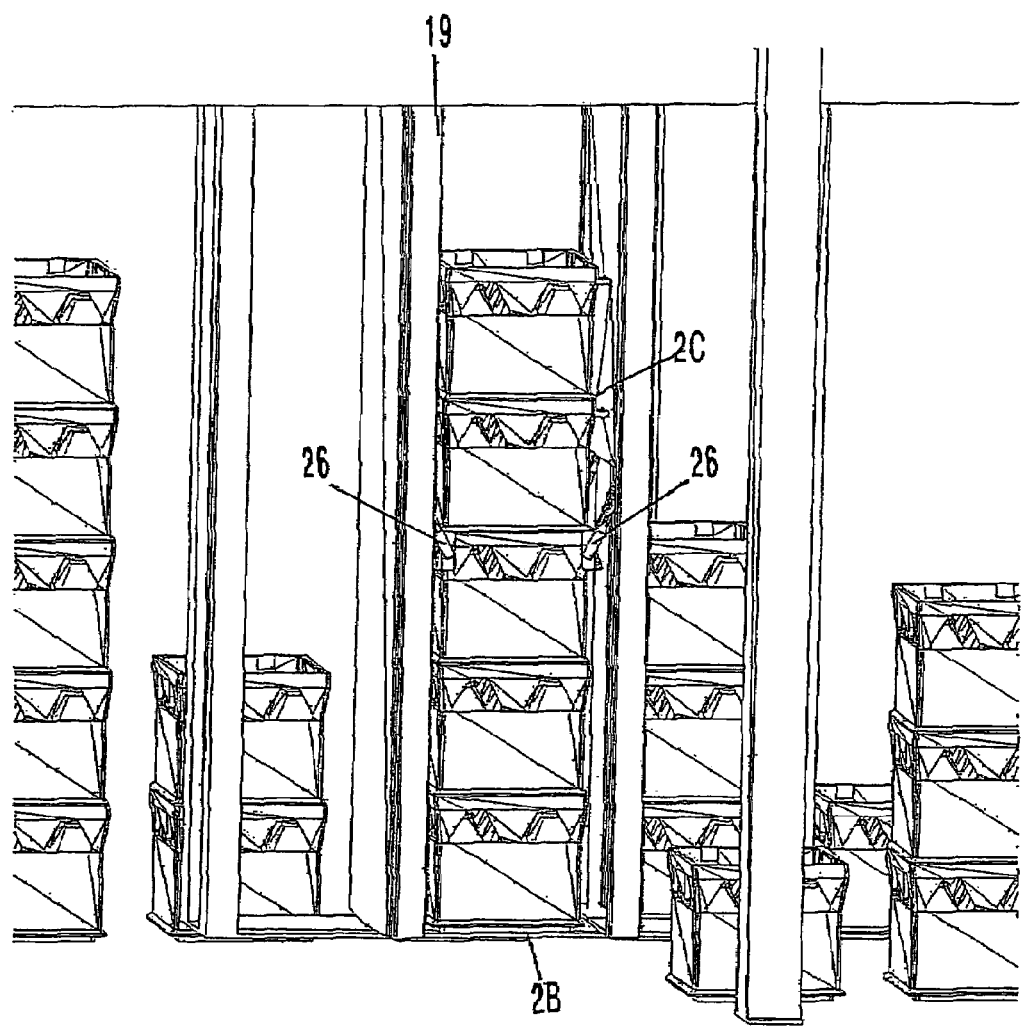
Figure 14:
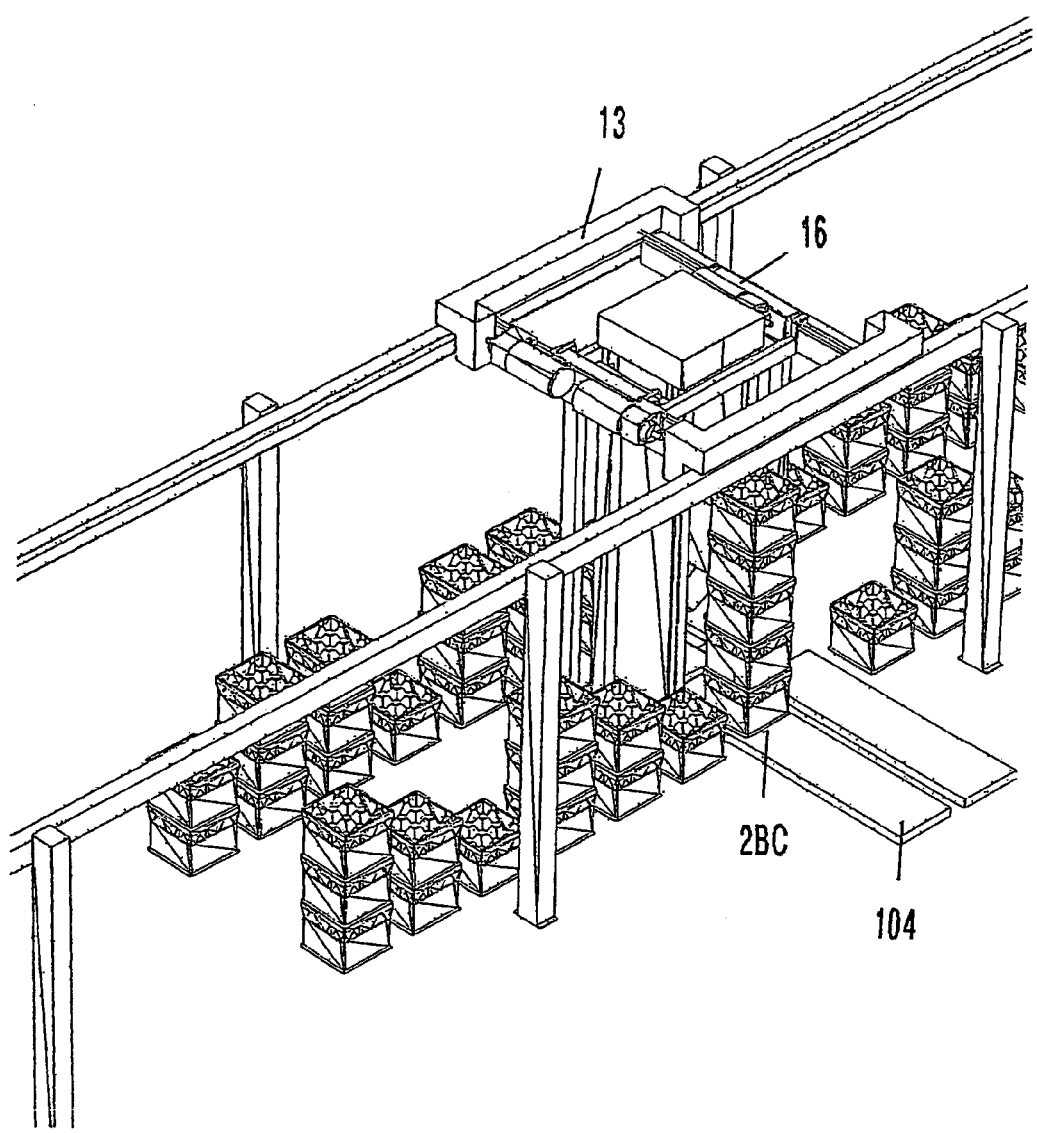

The gripping mechanism 19 is then located about a partial stack 2B from which all three containers are required by movement of the carriage 13 and trolley 16. The side plates 23 move to the lowest position and the tangs 24 engage with the containers 1A and 1B (FIG. 8). The partial stack 2B is moved onto the platform 18 by the trolley 16 and the tangs are retracted (FIG. 9). The carriage 13 and trolley 16 then move the gripping mechanism 19 around a second partial stack 2C, with the tangs 24 engaging with the containers in partial stack 2C (FIG. 10). The side plates 23 move the partial stack 2C above the partial stack 2B (FIG. 11) and the trolley 16 moves the partial stack over the stack 2B (FIG. 12). The partial stack 2C is then lowered onto the partial stack 2B (FIG. 13), with the guides 26 ensuring that the two partial stacks 2B and 2C align. The carriage 13 then moves the combined stack 2BC adjacent to the out-feed conveyor 104, the tangs 24 engaging with the lowest containers of the combined stack 2BC en route. The combined stack is then lifted off the platform 18 by upward movement of the side plates 23 and moved over the out-feed conveyor 104 by the trolley 16. The stack 2BC is lowered onto the out-feed conveyor 104 by downward movement of the side plates 23, the tangs 24 are retracted and the trolley 16 moves back into the aisle 102 (FIG. 14). The stack 2BC may be conveyed away from the store 101A, 101B by the out-feed conveyor 104 to a required location.

The operation of the conveyors 103, 104, carriage 13, trolley 16, side plates 23, tangs 24 and guides 26 may be electronically controlled by a manager computer, which in turn may be part of a larger warehouse management system. The manager computer can route the gripping mechanism 19 so that it travels the least distance to perform its operations using known algorithms. By allowing the gripping mechanism 19 to move sideways to grip containers in a stack, it only needs to move approximately one container width from the aisle to engage any number of containers in a stack. This is in contrast to a gripping mechanism that moves over a stack from above, requiring vertical movement over up to a full stack to retrieve or place a stack. Also, the side plates 23 can move into position for the next pick up or drop off of containers concurrently with movement of the carriage 13 along the aisle 102.

In an alternative embodiment of the invention, the platform 18 may be omitted. In this embodiment, the tangs 24 are used to carry the stack or partial stack along the aisle 102. In the case of a stack being created, the tangs 24 would put their existing partial stack down on the ground in the aisle 102 adjacent to the stack from which the next containers were to be collected. The containers to be collected would be gripped, brought out and meshed with the forming stack in the aisle, and then the resultant stack or partial stack gripped by the tangs 24 and transported to the next location. This embodiment may be less efficient than one that includes a movable platform along the aisle.

Figure 15:
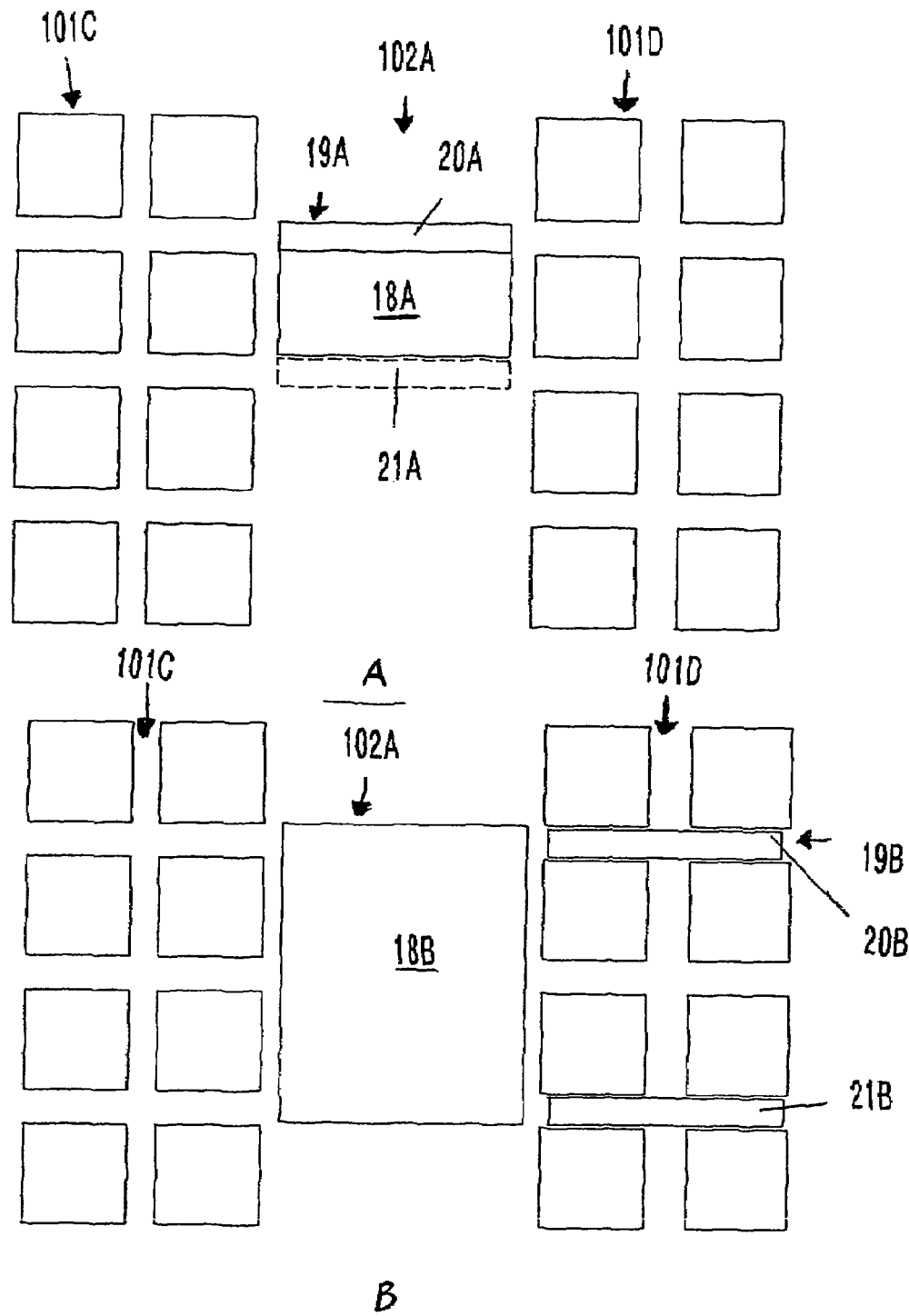
FIGS. 15A, 15B: Show schematic representations of two alternative embodiments of a gripping mechanism according to the present invention.

The gripping mechanism need not grip both sides of a container, particularly when the container is rigid, robust and includes a handle or similar to which the gripping mechanism can securely engage. Rigid plastic crates may be engaged by tangs through their handles on one side only and lifted and moved about. Therefore, referring to FIG. 15A, which shows a schematic top view of a container store 101C, 101D and a portion of a gripping mechanism 19A, one arm 21A may optionally be omitted, with arm 20A gripping containers from one side only. Alternatively, the other arm may be moved another container away, allowing the gripping mechanism 19B to grip up to four stacks or partial stacks, as shown in FIG. 15B.

FIGS. 15A and 15B show a container store 101C, 101D two stacks deep. In each store, the gripping mechanism 19A, 19B respectively may span two rows to allow multiple stacks or partial stacks to be moved at once. The aisle 102A is widened to accommodate the two adjacent stacks. A platform 18A, 18B is also widened to carry the adjacent stacks and lengthened for gripping mechanism 19B. The in-feed and out-feed conveyors would be correspondingly widened for the gripping mechanisms 19A, 19B. A gripping mechanism that can grip more than two stacks deep may be provided if required, with a corresponding widening of the aisle. The gripping mechanism would have two independently operable sets of tangs (not shown) to allow variable numbers of containers to be retrieved from each row. It is anticipated that containers in adjacent stacks will contain the same product so that the stacks closer to the aisle 102A can be retrieved first for any retrieval actions of less than a full stack, leaving space for the outer containers to move into the aisle 102A.

Figure 16:
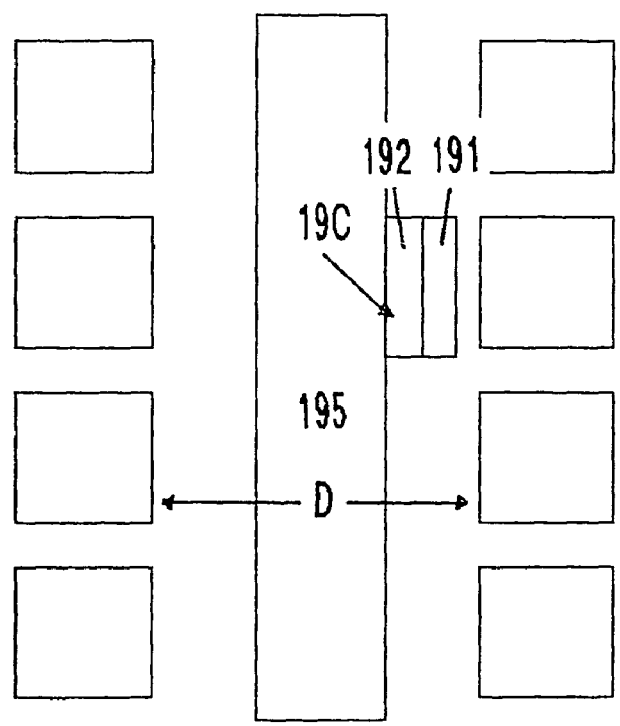
FIGS. 16A, 16B: Show schematic representations of two further alternative embodiments of a gripping mechanism according to the present invention.
Figure 16:
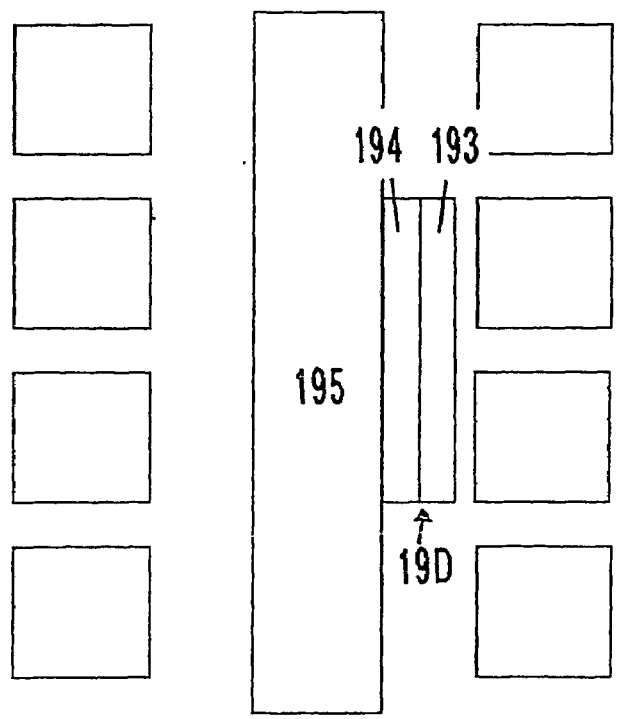

FIGS. 16A and 16B show two further alternative embodiments that are possible if the gripping mechanism can grip from one side only. Where two rows are provided, the gripping mechanism 19C grips single stacks or partial stacks of containers on both sides 191 and 192. The gripping mechanism 19C is moved sideways as indicated by arrow D to engage with a stack or partial stack from its side (in this case its side facing the aisle instead of the side facing an adjacent stack) and move that stack or partial stack into the aisle 102B. FIG. 16B shows an embodiment where the gripping mechanism 19D, which also grips on both sides 193 and 194, extends along two stacks. Other gripping mechanisms may extend along three or more stacks. Where multiple stacks can be gripped, the gripping mechanism has independently controllable portions for each stack. A conveyor 195 may be provided for gripping mechanisms 19C and 19D to hold containers while the gripping mechanisms 19C, 19D retrieve more containers. The operation of the conveyor 195 may be similar to the conveyor 196 described herein below. Alternatively, the gripping mechanisms 19C and 19D may place the containers onto the floor of the aisle. Although spaces between stacks of containers in a row are shown in FIGS. 16A and 16B, these are not necessary using a gripping mechanism of the type shown in these figures.

Figure 17:
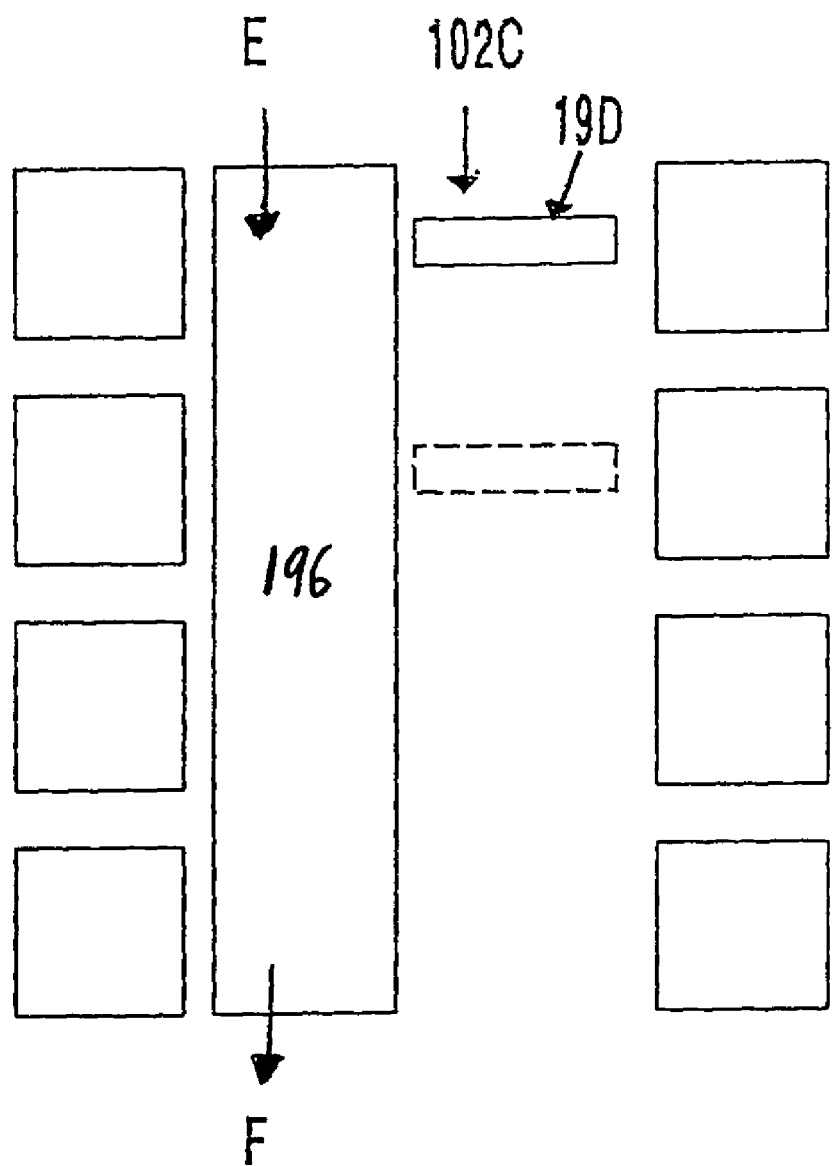
FIG. 17: Shows a schematic representation of an alternative embodiment of a controlled area including a gripping mechanism according to the present invention.

FIG. 17 shows a further alternative embodiment of the invention. A conveyor 196 is provided within the aisle 102C, the conveyor travelling along the aisle 102C. The gripping mechanism 19D does not include an associated platform, although a platform may be included provided it clears the conveyor 196, which may be sunk into the ground to achieve this. New full stacks are fed in at one end of the conveyor 196 as indicated by arrow E. Stacks and partial stacks exit out the other end, on the same conveyor 196, as indicated by arrow F. The gripping mechanism 19D, under the control of a manager computer, would dodge from one side to the other taking partial stacks off the conveyor and putting them away as well as collecting partial stacks and placing them on the conveyor. The gripping mechanism moves along the rows on the side of the aisle 102C not taken up with the conveyor 196. The manager computer would need to track the location of the stacks and partial stacks as they move along the conveyor 102 in order to control the movement of the gripping mechanism 19D. The conveyor 102 may always travel, or alternatively travel under the control of the manager computer. In another embodiment, there might be a triple width aisle with two conveyors, one to carry in-feed product and the other to carry out-feed product.

Where multiple stacks are handled by the gripping mechanism, the in-feed and out-feed conveyors may be widened to accommodate the stacks, or alternatively they may extend into the aisle so that individual stacks can be released onto the conveyor and conveyed away before the next stack is placed on the conveyor. When stacks are entering the store, each stack may be picked up in turn by the gripping mechanism before the next one is conveyed into the aisle.

Figure 18:
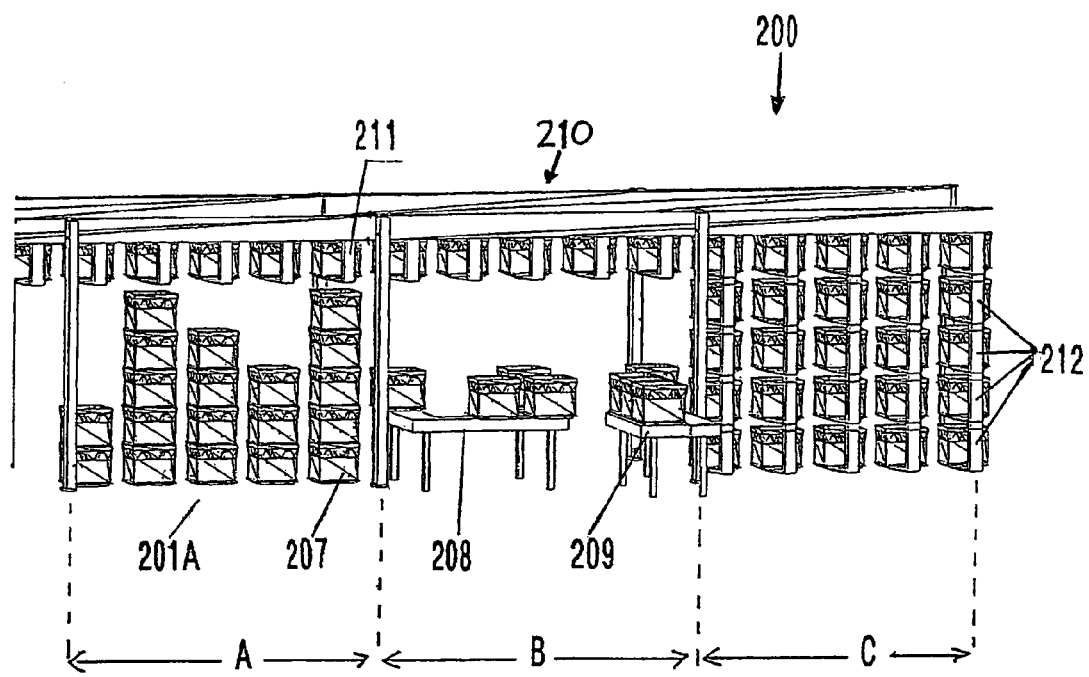
FIG. 18: Shows part of a controlled area including apparatus for transporting containers according to a second embodiment of the present invention.
Figure 19:
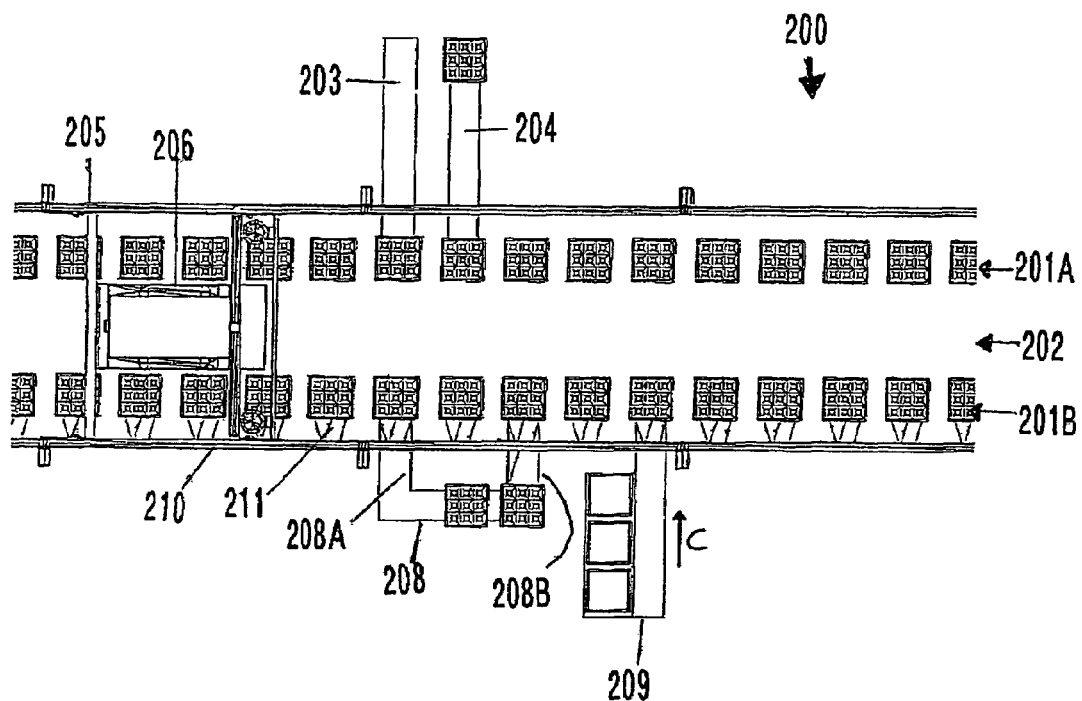
FIG. 19: Shows a plan view of the part of the controlled area of FIG. 18.

FIGS. 18 and 19 show a portion of a controlled area 200 including apparatus for transporting containers according to a further embodiment of the present invention. For clarity of explanation, in FIG. 18 the distal side of the controlled area has been omitted. The controlled area 200 is similar to the controlled area 100 described herein above and includes a container store 201A, 201B arranged in two rows separated by an aisle 202. An in-feed conveyor 203 supplies containers to the controlled area 200 and an out-feed conveyor 204 takes containers away from the controlled area 200.

The controlled area 200 includes an overhead gantry system 210. The overhead gantry system 210 is similar to the overhead gantry system 10, except that it extends higher than the overhead gantry system 10. The additional height of the gantry system 210 is provided to allow the gantry system 210 to place containers on to and retrieve containers from the storage shelves 211 (one only indicted in FIGS. 18 and 19). A carriage 205 and trolley 206, similar to carriage 12 and trolley 16 respectively transports a gripping mechanism for the containers in the container store 201A, 201B.

The controlled area 200 may include different store areas. In FIG. 18, three different store areas A-C are shown. In store area A, stacks of containers, one of which is referenced 207 are located below shelves 211. In store area B, no stacks are provided below the shelves 211, leaving space for other functions in the controlled area. In the example in FIG. 18, tables 208 and 209 are provided below the shelves 211 in store area B. In store area C, further shelves 212 are provided below shelves 211. The container store 201A, 201B may have the same or different store area types on opposing sides of the aisle 202.

A particular order may only require one or two items of product, rather than a full container of product. This usually requires product to be removed from a container. Typically product is picked from containers manually by a picker, either with the picker travelling to the location of a container holding the required product or a conveying system transporting a container holding the required product to the picker. After product has been picked from a container, the partially picked container needs to be stored somewhere until the same product is required to be picked by a picker.

The gantry systems 10, 210 may both be used to provide individual containers to a certain location. Thus, the gantry systems 10, 210 may retrieve containers from container store 101A, 101B or 201A, 201B respectively and supply them to a picker for picking product. After the picker has picked the required product from a container, the gantry systems 10, 210 may return the partially full container to the container store. When using the controlled area 100, the partially full container must be placed on top of a stack if they are to be stored inside the controlled area 100. Therefore, if any containers below a partially full container must be retrieved, the stack must be reorganised. The controlled area 200 avoids this problem by providing shelves 211, 212 where individual containers may be stored.

Referring particularly to FIGS. 18 and 19, an example of a manual picking system incorporated into the controlled area 200 is shown. The manual picking system includes two tables 208, 209. The first table 208 is provided to receive containers from the gantry system 210 at a first end 208A and provide containers for retrieval by the gantry system 210 at a second end 208B. A conveyor or other transport means is provided on the table 208 to transport containers from end 208A to end 208B as required. A picker stands adjacent to the table 208 and picks product from containers on the table 208. After the required product has been picked from a container, the container is transported to end 208B, where it is retrieved by the gantry system 210 and replaced in one of the storage shelves 211 or 212, awaiting a time when product must again be picked from within the container.

The picker places the picked product in a container on table 209. Once a container on table 209 is filled with the required product, the picker moves the container backwards and the container is conveyed in the direction indicated by arrow C for retrieval by the gantry system 210. The gantry system may immediately transport the container from table 209 to the out-feed conveyor 204, or may temporarily store the container in a shelf 211 or 212 before transportation to the out-feed conveyor 204. In an alternative embodiment, the table 209 may feed containers directly out of the controlled area 200, for example to a stacker or palletiser.

In order to reduce the amount of travelling that the gantry system 210 has to perform to supply containers to table 208, the gantry system 210 preferably supplies containers in groups. For example, the gantry system 210 may travel to a number of shelves 211, 212, stacking containers on a platform like platform 18 described in reference to gantry system 10 and then place the containers onto the table 208.

To further reduce the amount of travelling of the gantry system 210, the table 209 preferably includes containers for multiple orders. Thus, if a container having product required for two different orders in on table 208, the picker may pick product to satisfy both orders. The actions of the picker and order of the containers supplied to table 208 are preferably controlled by a manager computer including optimisation software to optimise the operation of the gantry system 210.

In an alternative embodiment of the present invention, shelves 211 and/or 212 may be adapted to hold a partial stack of containers. Preferably, each shelf 211, 212 supports containers having like product in order to avoid the gantry system 210 having to shuffle the containers. Furthermore, each shelve 211 and/or 212 may be two containers wide and/or two containers deep with use of an appropriate gripping mechanism similar to those described herein with reference to FIGS. 15 and 16.

Those skilled in the relevant arts will appreciate from the foregoing description that the controlled areas of the present invention may be operated to supply stacks of containers, partial stacks of containers, mixed stacks of containers, and individual containers to their respective out-feed. In addition, the controlled area 200 may be operated to supply mixed containers of product to its out-feed.

According to one embodiment of the present invention, the controlled area may be used as a temporary store for excess product only rather than a container store. This is in contrast to the use described herein above of maintaining a supply of product in the controlled area, retrieving product from the controlled area to fulfil an order and supplying product to the controlled area as required, replenishing any depleted product.

Referring to the embodiment of the invention shown in FIG. 1, taking for example an order for ten containers of a product n and assuming that a full stack of containers is four high, a manager computer identifies that this order constitutes two stacks plus two containers. The order is therefore fulfilled by sending three stacks of containers along the in-feed conveyor 103. The gripping mechanism 19 picks up two of the stacks and immediately transfers them onto the out-feed conveyor 104. The gripping mechanism 19 picks up the entire third stack from the in-feed conveyor 103, but only releases two containers onto the out-feed conveyor 104. The remaining two containers from the third stack are placed into the container store 101A, 101B. The controlled area 100 is then used to fulfil other orders until the next order for product n needs to be fulfilled.

If the next order of product n requires a partial stack of three containers, then a full stack is conveyed into the controlled area on the in-feed conveyor 103 and transferred onto the out-feed conveyor 104 by the gripping mechanism 19 less one container, which is kept in the container store 101A, 101B, preferably on top of the partial stack of two containers that were excess from the previous order. If the next order for product n is a multiple of four containers, then a full stack is conveyed into the controlled area on the in-feed conveyor 103 and transferred in its entirety onto the out-feed conveyor 104. If the next order for product n requires a partial stack of two containers, then the gripping mechanism may retrieve the previously stored two containers and place them onto the out-feed conveyor 104, together with any full stacks retrieved from the in-feed conveyor 103 if the order was for a multiple of four containers plus two. Mixed stacks of containers may be supplied by the controlled area 100 by placing two or more containers of product on top of each other, each container of product retrieved from the container store 101A, 101B if there are sufficient containers of that product in the store 101A, 101B to make up the partial stack and from the in-feed conveyor 103 if there are insufficient containers in the store 101A, 101B.

Therefore, according to this embodiment, the container store 101A, 101B may be used as a container store for excess product only, rather than an independent store of complete stacks of product. Preferably, containers are stored in the store only in order to produce a required partial stack. However, if a larger storage space is available, the product store could accumulate more containers in the store if required. Product is only retrieved from the store when there are a sufficient number of containers in the store to make up a required stack.

In further alternative embodiments, the in-feed conveyor 103 and out-feed conveyor 104 may be linked in some manner so as to allow full stacks of containers to be transferred from the in-feed conveyor 103 to the out-feed conveyor 104 without using the gripping mechanism 19. For example, the transfer may be achieved by ram that pushes a stack across the conveyors or alternatively the in-feed conveyor may branch into two, one branch leading to the pick-up point for the in-feed conveyor 19 and the other leading to the out-feed conveyor 104. In a further alternative embodiment, the in-feed and out-feed conveyors may be combined into a single conveyor that travels along the aisle 102 (see FIG. 17). Not using the gripping means 19 to transfer full stacks from an in-feed to an out-feed may increase the throughput of the controlled area.

The manager computer may randomly place any excess containers into any available space in the container store 101A, 101B, recording the location of placement into memory so that the gripping mechanism 19 can retrieve containers from the same location when required. However, more efficient operation may be achieved by locating product that occurs more frequently in orders near to the in-feed conveyor 103 and out-feed conveyor 104 so that the travel time of the gripping mechanism is reduced. The container store 101A, 101B may have pre-allocated spaces for products, with products that occur in orders with a higher frequency located about the conveyors and those that occur with a lesser frequency located further from the conveyors.

The method of container handling described above may be used with other automated picking systems. For example, the gripping mechanism 19D shown in FIG. 17 may be replaced by the robot system described in the specification published as European Patent Publication EP0767113, in which case the aisle 102C may be removed and product could be stored several layers deep away from the conveyor 196, each layer optionally holding different product from its adjacent layer.

Furthermore, the method may not necessarily handle stacks and partial stacks of containers. Instead, with an appropriate gripping mechanism, horizontal stacks of containers (i.e. containers placed side-by-side) may be handled, for example horizontal stacks retrieved off a pallet of containers. Full horizontal stacks would be placed onto the in-feed part of the conveying system and the gripping mechanism would remove some containers from the horizontal stack as required. The container store would then be configured to hold partial horizontal stacks of containers. Other groups of containers may be used, for example layers or frames of product, with appropriate selection of a gripping mechanism and appropriate configuration of the container store and depending on the required granularity of orders.

In the embodiments described herein above, a single aisle has been provided between two rows, with the gripping mechanism moving along the aisle. The controlled area may include a single row, with the "aisle" described herein simply being a space beside the row. A single row embodiment may be less preferred due to reducing the ability to handle multiple products and reducing the capacity of the container store. The controlled area may also include two or more parallel adjacent aisles serviced by a gripping mechanism on a carriage of an overhead gantry system that spans the multiple aisles. The gripping mechanism may travel through a space in the rows in order to move between rows or may travel around the end of the rows. The gripping mechanism may alternatively rise up and travel over the rows, this embodiment requiring extra space above the container store. Where the in-feed and out-feed conveyors are provided transverse to the rows, they may extend through the rows to the end row and the gripping mechanism may travel over the conveyors to move between rows.

Furthermore, multiple rows may be provided vertically adjacent to each other. For example, a total of four rows could be provided by having two at ground level on each side of an aisle and two above the ground level aisles. The upper rows would be located on a suitable support structure. The gantry system and gripping mechanism may then be movable between the two rows to store and retrieve product. The shape of the gripping mechanism may be changed from an inverted "U" shape to a "C" shape if required to allow access to the rows.

The rows of the controlled area need not be linear and may include a bend or be curved, provided that the gripping mechanism or other engagement means can be moved next to the row. For example, the row may define a U-shape and a gantry system for a gripping mechanism travelling around the inside of the U.

Where in the foregoing description reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. Automated apparatus suitable for transporting containers arranged in a first row, the apparatus comprising an overhead gantry system, the overhead gantry system comprising:

a moveable support for supporting at least one stack or partial stack of said containers, the support operable to move the at least one stack or partial stack of containers thereon along the first row;

engagement means moveable independently of said support in a direction transverse to the row between a first position in which the engagement means can engage with any selected container or containers from a selected stack or partial stack of containers in the first row, wherein the selected stack or partial stack comprises a plurality of containers, and a second position in which to engagement means, any container or containers engaged with the engagement means and any containers located on top of the container or containers engaged with the engagement means arc above said support; and wherein the engagement means is moveable along the first row when the engagement means is in the second position, and can move the container or containers engaged with the engagement means vertically, thereby allowing a container or containers engaged with the engagement means to be placed either on the support or on partial stack supported by said support.

2. The apparatus of claim 1, wherein the second position is defined as any location between the first row and a second row extending substantially parallel to the first row, wherein the engagement means can travel along the first and second rows and wherein the apparatus is operable to move the engagement means transverse to the second row, between a third position where the engagement means can engage with any selected container or containers from a selected one of the stacks or partial stacks in the second row, and the second position.

3. The apparatus of claim 2, including conveying means to convey containers to the engagement means and receive containers from the engagement means and convey containers away from the engagement means, the conveying means extending into a gap along the length of said second row.

4. The apparatus of claim 1, including a guide that in use aligns a first partial stack located beneath the engagement means with a second partial stark engaged with the engagement means so as to allow the engagement means to release the second partial stack onto The first partial stack.

5. The apparatus of claim 1 suitable for transporting containers arranged on a floor in one or more rows of spaced apart stacks or partial stacks, wherein the engagement means includes at least one arm that is located in the space between stacks or partial stacks in the row or rows when the engagement means is in the first position.

6. The apparatus of claim 5, wherein the engagement means includes at least two anus spaced apart by either one or two columns in a row.

7. The apparatus of claim 5 suitable for transporting containers arranged on a floor in at least two adjacent rows of spaced apart stacks or partial stacks, wherein the at least one arm is dimensioned to be able to engage with containers across two or more rows.

8. The apparatus of claim 1, wherein the engagement means spans two or more stacks along a row and is engageable with at least one container in each of said two or more stacks.

9. The apparatus of claim 1, further including a conveyor extending along said row, wherein the engagement means is operable to retrieve and place stacks or partial stacks from or onto said conveyor respectively.

10. A container store including space to hold one or more rows of stacks of containers and the apparatus as claimed in claim 1, adjacent to said one or more rows, and wherein the container store includes in the line of at least one of said one or more rows of stacks a plurality of shelves for holding partial stacks, wherein the shelves are located, shaped and dimensioned so that the engagement means of said apparatus can engage with containers held on the shelves.

11. The container store of claim 10, wherein each shelf holds only a single container.

12. The container store of claim 10, further including one or more tails areas in which mixed containers of product are made by picking product from containers and placing picked product into a required container, wherein said apparatus is operable to retrieve mixed containers of product from the one or more tails areas and supply containers said one or more tails areas.

13. The apparatus of claim 1 wherein the moveable support is a moveable platform.

14. The apparatus of claim 13 wherein the moveable platform is adapted to support a plurality of stacks or partial stacks.

15. The apparatus of claim 13 wherein the moveable platform is adapted to support three stacks or partial stacks.

* * * * *